United States Patent
Iwasa et al.

(10) Patent No.: US 7,920,454 B2
(45) Date of Patent: Apr. 5, 2011

(54) OPTICAL RECORDING MEDIUM, AND METHOD AND APPARATUS FOR OPTICAL RECORDING AND REPRODUCING THEREOF

(75) Inventors: Hiroyuki Iwasa, Yokohama (JP); Michiaki Shinotsuka, Hiratsuka (JP); Masaru Shinkai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1417 days.

(21) Appl. No.: 11/273,390

(22) Filed: Nov. 15, 2005

(65) Prior Publication Data
US 2006/0098561 A1    May 11, 2006

Related U.S. Application Data

(63) Continuation of application No. PCT/JP2004/005979, filed on Apr. 26, 2004.

(30) Foreign Application Priority Data

May 16, 2003 (JP) ................................. 2003-138868
Feb. 4, 2004 (JP) ................................. 2004-028603

(51) Int. Cl.
*G11B 7/24* (2006.01)
(52) U.S. Cl. ..................... 369/94; 369/275.1; 369/275.2; 369/275.3
(58) Field of Classification Search ............. 430/270.13; 369/275.1, 275.2, 275.3, 275.4, 283, 272.1
See application file for complete search history.

(56) References Cited

U.S. PATENT DOCUMENTS

| | | | |
|---|---|---|---|
| 5,627,817 A * | 5/1997 | Rosen et al. ................... 369/100 |
| 6,018,510 A * | 1/2000 | Abe et al. .................... 369/275.1 |
| 6,221,455 B1 * | 4/2001 | Yasuda et al. ................ 428/64.1 |
| 6,280,811 B1 * | 8/2001 | Nee .............................. 428/64.1 |
| 6,353,592 B1 * | 3/2002 | Kashiwagi et al. ........... 369/283 |
| 6,721,265 B1 * | 4/2004 | Fujii et al. ................... 369/275.4 |
| 2002/0021657 A1 * | 2/2002 | Lee et al. ..................... 369/275.4 |
| 2002/0054983 A1 * | 5/2002 | Nishihara et al. ............. 428/212 |
| 2003/0235783 A1 * | 12/2003 | Liu et al. ................... 430/270.11 |
| 2005/0213467 A1 | 9/2005 | Noda et al. | |

FOREIGN PATENT DOCUMENTS
CN    1726537    1/2006
(Continued)

OTHER PUBLICATIONS

Sabi et al., Development of Organic Recording Media for Blue High Numerical Aperture Optical Disc System, Sep. 19, 2002, Japanese Journal of Appled Physics vol. 42, pp. 1056-1058.*

(Continued)

*Primary Examiner* — Hoa T Nguyen
*Assistant Examiner* — Andrew J Sasinowski
(74) *Attorney, Agent, or Firm* — Dickstein Shapiro LLP

(57) ABSTRACT

An optical recording medium wherein a laser beam at a wavelength $\lambda$ is irradiated and recording and reproducing of information are performed by optical power modulation of binary or more, and when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied.

$$4\lambda/16n_1 \leq d_1 \leq 7\lambda/16n_1$$

$$\lambda/16n_2 \leq d_2 \leq 3\lambda/16n_2 \text{ or } 4\lambda/16n_2 \leq d_2 \leq 7\lambda/16n_2$$

$$0.2 \leq w_1/p_1 \leq 0.55$$

$$0.2 \leq w_2/p_2 \leq 0.55$$

20 Claims, 5 Drawing Sheets

FOREIGN PATENT DOCUMENTS

| | | |
|---|---|---|
| EP | 0 911 820 A1 | 4/1999 |
| JP | 2702905 | 3/1997 |
| JP | 11-031337 | 2/1999 |
| JP | 2000-082238 | 3/2000 |
| JP | 2000-311384 | 11/2000 |
| JP | 2001-084643 | 3/2001 |
| JP | 2001-101709 | 4/2001 |
| JP | 2002-184032 | 6/2002 |
| JP | 2003-115129 | 4/2003 |
| JP | 2003-123324 | 4/2003 |
| WO | WO00/16320 | 3/2000 |
| WO | WO00/23990 | 4/2000 |

OTHER PUBLICATIONS

Yamaguchi et al., 4.7 GB Phase Change Optical Disc with In-Groove Recording, Nov. 24, 1998, Japanese Journal of Appled Physics vol. 38, pp. 1806-1810.*

Supplementary European Search Report dated Jul. 30, 2008.
Chinese Office Action dated Jul. 27, 2007.

* cited by examiner

OPTICAL RECORDING MEDIUM, AND METHOD AND APPARATUS FOR OPTICAL RECORDING AND REPRODUCING THEREOF

CROSS-REFERENCE TO RELATED APPLICATIONS

This is a continuation of application Ser. No. PCT/JP2004/005979, filed on Apr. 26, 2004.

BACKGROUND OF THE INVENTION

1. Field of the Invention

The present invention relates to an optical recording medium in which recording and reproducing of information are performed by a laser beam irradiation, in particular, a one-side multilayer optical recording medium which is capable of large-capacity, high-density recording, and method and apparatus for optical recording and reproducing thereof.

2. Description of the Related Art

In compact disc (CD) or DVD system in general, recording of binary signals and detection of tracking signal are performed by reflectance modulation arisen from the light interference from the bottom and mirror surface parts of the concave pit. In late years, recordable compact disc (CD-R) having an organic dye film as a recording layer and a phase-change, rewritable compact disc (CD-RW: CD-Rewritable) are increasingly used as CD-compatible (compatible) medium for reproducing, and various proposals are given for DVD system such as recordable DVD and phase-change rewritable DVD. Of the optical recording medium having conventional organic dye thin film as recording layer, the ones containing phthalocyanine compound, cyanine dye, phenalene dye, naphthoquinone dye, and the like in the organic dye thin film are known.

A recordable compact disc-type recording medium (CD-R), in which an organic dye, a metal reflective layer, and a UV resin protective layer are sequentially disposed on a substrate, requires high reflectance to meet the CD standards. Therefore, it was required to develop a highly stable organic dye with high refraction index at a reproduction wavelength (770 nm to 830 nm) (reproduction wavelength of DVD±R, which is recordable DVD, is 630 nm to 680 nm).

With respect to CD-R and DVD±R, a number of optical recording medium have been proposed in which cyanine dye, phthalocyanine dye or azo metal-chelate dye, or the like are used as recording material paring with metal reflective layers.

Guiding grooves for signal recording, which is called "groove land" and consist of irregularity forms, are formed in an optical disc. The side caving in a form of concavity in a direction getting farther from the site from which a laser beam is irradiated for recording and reproducing is called "land" and the side bulging in a form of convexity in a direction approaching the site is called "groove". The recordable capacity is decided by the pitch (track pitch) of guiding grooves which are recordable and reproducible. For example, DVD+R or DVD+RW employs groove recording method by which information is recorded only in grooves and track pitch is 0.74 μm when recording capacity is 4.7 GB. Furthermore, land groove recording method in which recording takes place in both groove and land is also known and is employed in DVD-RAM.

Recently, to increase the storage capacity of an optical disc, a multiple data layer system has been proposed. An optical disc having two or more data layers is accessible to various layers by changing its lens focal point.

A one-side multilayer, recordable disc using organic dye layer is described in International Publication No. WO00/016320 and International Publication No. WO00/023990, however, information layer is a repeated single organic dye layer and it is not a layer composition considering DVD, etc. compatibility.

A one-side multilayer, recordable disc is described in Japanese Patent Application Laid-Open (JP-A) No. 2001-084643 and JP-A No. 2001-101709, however, inorganic material is used in the recording layer, posing a cost problem.

Further, groove shapes and push-pull values are not mentioned at all in these known literatures.

A one-side multilayer, recordable optical disc is also described in JP-A No. 2000-082238 and JP-A No. 2000-311384, however, consideration are not given over issues such as optimizing optical properties of each layer and performing appropriate recording and reproducing by stable tracking, etc. and there is no mention about push-pull.

On the other hand, phase-change rewritable CD and DVD dictate the recording information signal using reflectance and phase differences generated by refraction index difference between noncrystal and crystal condition. A phase-change optical recording medium in general has a composition consisting of lower protective layer, phase-change recording layer, upper protective layer and reflective layer on a substrate (These are collectively called "information layer") and multiple interactions of these information layers can be used to control reflectance and phase differences to become CD or DVD compatible. Within a range of reflectance being decreased by about 15% to 25%, CD-RW can be made CD compatible in terms of recording signal and groove signal and reproducing is possible for a CD drive with added amplification system to cover low reflectance.

In addition, because phase-change optical recording medium can perform erasing and re-recording process only by power modulation of one conversing light beam, recording includes overwrite recording in which recording and erasing are performed simultaneously in the phase-change optical recording medium such as CD-RW or rewritable DVD (DVD+RW, DVD−RW, etc.). Crystal, noncrystal or combination of these conditions can be used for phase-change recording of information and it is possible to use multiple crystal phases, however, rewritable phase-change optical recording medium that have been put in use currently recognize unrecorded and erased condition as crystal condition and perform a recording by forming amorphous marks.

Chalcogen element, that is, chalcogenide alloys including S, Se and Te are mainly used for material of phase-change recording layers. Examples include GeSbTe series mainly consist of GeTe—$Sb_2Te_3$ pseudo-binary alloy, InSbTe series mainly consist of InTe—$Sb_2Te_3$ pseudo-binary alloy, AgInSbTe series and GeSbTe series mainly consist of $Sb_{0.7}Te_{0.3}$ eutectic alloy, and the like. In particular, a recording material of Sb—Te eutectic alloy series, one of the materials popularly used for phase-change optical recording medium such as CD-RW, etc., excels in erasing ratio and has high sensitivity compared to the recording material of GeTe—$Sb_2Te_3$ pseudo-binary compound series, and it is known as the best from the viewpoint of definite outline of amorphous part of the recording mark.

As for DVD, it is also possible to increase the number of information recording layers besides density increase of the recording surface in order to improve the recording density of the optical disc. For example, DVD, which has been standardized and commercialized in late years, has a double information recording layer and it is an optical disc in which read out of double information recording layer is possible from one side of the disc. Lately, optical discs having double information recording layer have been developed and reported as recording and reproducing-type DVD (Japanese Patent (JP-B) No. 2702905 and JP-A No. 2002-184032, for example). However, these have not been put in practical use as commercial products.

An information layer disposed on the front side of one-side multilayer optical disc (it is called "the first information layer") is required to transmit approximately 50% of the laser beam for recording and reproducing of the information layer disposed on the back side (it is called "the second information layer"). Further, the first information layer is required to absorb approximately 40% of the laser beam in order to perform recording with good sensitivity. For above reasons, according to the standards, for example, reflectance of a recordable DVD is 45% to 85% for DVD+R and reflectance of a rewritable DVD is 30% or less for DVD+RW, however, reflectance of the first information layer of a one-side multilayer optical disc further decreases, possibly unstablizing the tracking. On the other hand, because a signal reflected by the second information layer is absorbed by the first information layer, the fraction reaching the light receiving element becomes approximately 50%, therefore, reflectance is thought to be deteriorated.

There is no mention about groove shapes in the Japanese Patent (JP-B) No. 2702905 and though guiding groove width is specified in the JP-A No. 2002-184032, groove depth or push-pull value are not mentioned.

SUMMARY OF THE INVENTION

The present invention was conducted based on the current condition as described above and it is an object of the present invention to provide one-side multilayer, recordable optical recording medium and phase-change optical recording medium which can perform stable tracking and appropriate recording and reproducing for each information layer, method for recording and reproducing and apparatus thereof.

As a result of a dedicated investigation that has been carried out to settle issues of conventional art, the inventor found out that it is necessary to design reflectance, transmittance and absorptance of one-side multilayer optical disc in a balanced manner, and this has a great bearing on the groove shape. Furthermore, the inventor also found the optimal range of push-pull value for one-side multilayer optical disc which is influenced a great deal by groove shape as described later on. Push-pull signal is expressed by following Formula when a light receiving element of optical detector is divided by two in a radius direction and each output being I1 and I2. In the Formula, "pp" represents peak versus peak, "max" represents maximum value and "min" represents minimum value.

$$(I1-I2)pp/[\{(I1+I2)max+(I1+I2)min\}/2]$$

The present invention is based on above knowledge of the inventor and the measures to settle above issues are as described below.

<1> An optical recording medium comprising a first information layer, an intermediate layer and a second information layer sequentially disposed between a first substrate and a second substrate, wherein each information layer comprises a recordable recording layer comprising an organic dye and a groove is formed along the recording track, a laser beam at a wavelength $\lambda$ is irradiated from the first substrate to perform any one of recording and reproducing of information by optical power modulation of binary or more, and when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied.

$$4\lambda/16n_1 \leq d_1 \leq 7\lambda/16n_1$$

$$\lambda/16n_2 \leq d_2 \leq 3\lambda/16n_2 \text{ or } 4\lambda/16n_2 \leq d_2 \leq 7\lambda/16n_2$$

$$0.2 \leq w_1/p_1 \leq 0.55$$

$$0.2 \leq w_2/p_2 \leq 0.55$$

<2> The optical recording medium as set forth in above <1>, when the push-pull value of the first information layer prior to recording being PP1 and the push-pull value of the second information layer prior to recording being PP2, the following conditions are satisfied:

$$0.30 \leq PP1 \leq 0.70$$

$$0.25 \leq PP2 \leq 0.60$$

$$0.6 \leq PP1/PP2 \leq 1.4$$

<3> The optical recording medium as set forth in above <1>, wherein the refraction index "n" of single recording layer for the laser beam at a wavelength region of a wavelength $\lambda$ is $1.5 \leq n \leq 3.0$ and extinction coefficient "k" is $0.02 \leq k \leq 0.2$.

<4> The optical recording medium as set forth in above <1>, wherein the reflectance of unrecorded part is 18% to 30%.

<5> The optical recording medium as set forth in above <1>, wherein the DPD signal is 0.3 or more.

<6> The optical recording medium as set forth in above <1>, wherein the wavelength $\lambda$ of the laser beam is any one in a range of 350 nm to 700 nm and satisfies above conditions.

<7> The optical recording medium as set forth in above <6>, wherein the wavelength $\lambda$ of the laser beam is any one in a range of 630 nm to 680 nm and 390 nm to 420 nm and satisfies above conditions.

<8> An optical recording medium comprising a first information layer, an intermediate layer and a second information layer sequentially disposed between a first substrate and a second substrate, wherein each information layer comprises a recording layer comprising a phase-change recording material and a groove is formed along the recording track, a laser beam at a wavelength $\lambda$ is irradiated from the first substrate to perform any one of recording and reproducing of information by optical power modulation of binary or more, and when the refraction index of the first substrate being $n_1$, the refraction index of the intermediate layer being $n_2$, the groove depth, the groove width and the track pitch of the first information layer being $d_1$, $w_1$, and $p_1$ respectively and the groove depth, the groove width and the track pitch of the second information layer being $d_2$, $w_2$ and $p_2$ respectively, the following conditions are satisfied.

$$0.9\lambda/16n_1 \leq d_1 \leq 3\lambda/16n_1$$

$$0.9\lambda/16n_2 \leq d_2 \leq 3\lambda/16n_2$$

$$0.2 \leq w_1/p_1 \leq 0.6$$

$$0.2 \leq w_2/p_2 \leq 0.6$$

<9> The optical recording medium as set forth in above <8>, when the push-pull value of the first information layer prior to recording being PP1 and the push-pull value of the second information layer prior to recording being PP2, the following conditions are satisfied:

$$0.30 \leq PP1 \leq 0.70$$

$$0.25 \leq PP2 \leq 0.60$$

$$0.6 \leq PP1/PP2 \leq 1.4$$

<10> The optical recording medium as set forth in above <8>, wherein the phase-change recording layer comprises an alloy expressed by M1w (SbzTe100-z) 100-w ("w" and "z" represent atomic % and $0 \leq w < 15$ and $50 < z < 90$ and M1 represents at least one element selected from a group of In, Ga, Ge, Sn, Si, Zr, Nb, Ta, V, Ag, Al, Pt, Pb, Cr, Co, O, S and N).

<11> The optical recording medium as set forth in above <8>, wherein the phase-change recording layer comprises an alloy expressed by (Ge-M2) xSbyTe3+x ("x" and "y" represent atomic % and $2 \leq x < 22$ and $2 \leq y \leq 4$ and M2 represents at least one element selected from a group of Sn, Bi and Pb).

<12> The optical recording medium as set forth in above <8>, wherein the reflectance of a mirror surface part, a part of the disc where there is no groove, is 4% to 20%.

<13> The optical recording medium as set forth in above <8>, wherein the DPD signal is 0.3 or more.

<14> The optical recording medium as set forth in above <8>, wherein the wavelength λ of the laser beam is any one in a range of 350 nm to 700 nm and satisfies above conditions.

<15> The optical recording medium as set forth in above <14>, wherein the wavelength λ of the laser beam is any one in a range of 630 nm to 680 nm and 390 nm to 420 nm and satisfies above conditions.

<16> A recording and reproducing method of an optical recording medium, wherein recording and reproducing of information is performed by irradiating the laser beam at a wavelength of 350 nm to 700 nm to each information layer of the optical recording medium comprising a first information layer, an intermediate layer and a second information layer sequentially disposed between a first substrate and a second substrate, wherein each information layer comprises a recordable recording layer comprising an organic dye and a groove is formed along the recording track, a laser beam at a wavelength λ is irradiated from the first substrate to perform any one of recording and reproducing of information by optical power modulation of binary or more, and when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$$4\lambda/16n_1 \leq d_1 \leq 7\lambda/16n_1$$

$$\lambda/16n_2 \leq d_2 \leq 3\lambda/16n_2 \text{ or } 4\lambda/16n_2 \leq d_2 \leq 7\lambda/16n_2$$

$$0.2 \leq w_1/p_1 \leq 0.55$$

$$0.2 \leq w_2/p_2 \leq 0.55$$

and the optical recording medium comprising a first information layer, an intermediate layer and a second information layer sequentially disposed between a first substrate and a second substrate, wherein each information layer comprises a recording layer comprising a phase-change recording material and a groove is formed along the recording track, a laser beam at a wavelength λ is irradiated from the first substrate to perform any one of recording and reproducing of information by optical power modulation of binary or more, and when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied.

$$0.9\lambda/16n_1 \leq d_1 \leq 3\lambda/16n_1$$

$$0.9\lambda/16n_2 \leq d_2 \leq 3\lambda/16n_2$$

$$0.2 \leq w_1/p_1 \leq 0.6$$

$$0.2 \leq w_2/p_2 \leq 0.6$$

<17> An apparatus for performing recording and reproducing of the optical recording medium comprising a laser beam source from which a laser beam at a wavelength of 350 nm to 700 nm is irradiated, and a layer identifying unit and a layer switching unit for forming and dictating a mark on each information layer by irradiating the laser beam from the substrate side, wherein the optical recording medium is the optical recording medium comprising a first information layer, an intermediate layer and a second information layer sequentially disposed between a first substrate and a second substrate, wherein each information layer comprises a recordable recording layer comprising an organic dye and a groove is formed along the recording track, a laser beam at a wavelength λ is irradiated from the first substrate to perform any one of recording and reproducing of information by optical power modulation of binary or more, and when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$$4\lambda/16n_1 \leq d_1 \leq 7\lambda/16n_1$$

$$\lambda/16n_2 \leq d_2 \leq 3\lambda/16n_2 \text{ or } 4\lambda/16n_2 \leq d_2 \leq 7\lambda/16n_2$$

$$0.2 \leq w_1/p_1 \leq 0.55$$

$$0.2 \leq w_2/p_2 \leq 0.55$$

and the optical recording medium comprising a first information layer, an intermediate layer and a second information layer sequentially disposed between a first substrate and a second substrate, wherein each information layer comprises a recording layer comprising a phase-change recording material and a groove is formed along the recording track, a laser beam at a wavelength λ is irradiated from the first substrate to perform any one of recording and reproducing of information by optical power modulation of binary or more, and when the refraction index of the first substrate being $n_1$, the refraction index of the intermediate layer being $n_2$, the groove depth, the groove width and the track pitch of the first information layer being $d_1$, $w_1$, and $p_1$ respectively and the groove depth, the groove width and the track pitch of the second information layer being $d_2$, $w_2$ and $p_2$ respectively, the following conditions are satisfied.

$$0.9\lambda/16n_1 \leq d_1 \leq 3\lambda/16n_1$$

$$0.9\lambda/16n_2 \leq d_2 \leq 3\lambda/16n_2$$

$$0.2 \leq w_1/p_1 \leq 0.6$$

$$0.2 \leq w_2/p_2 \leq 0.6$$

DESCRIPTION OF THE PREFERRED EMBODIMENTS

Figure 1:
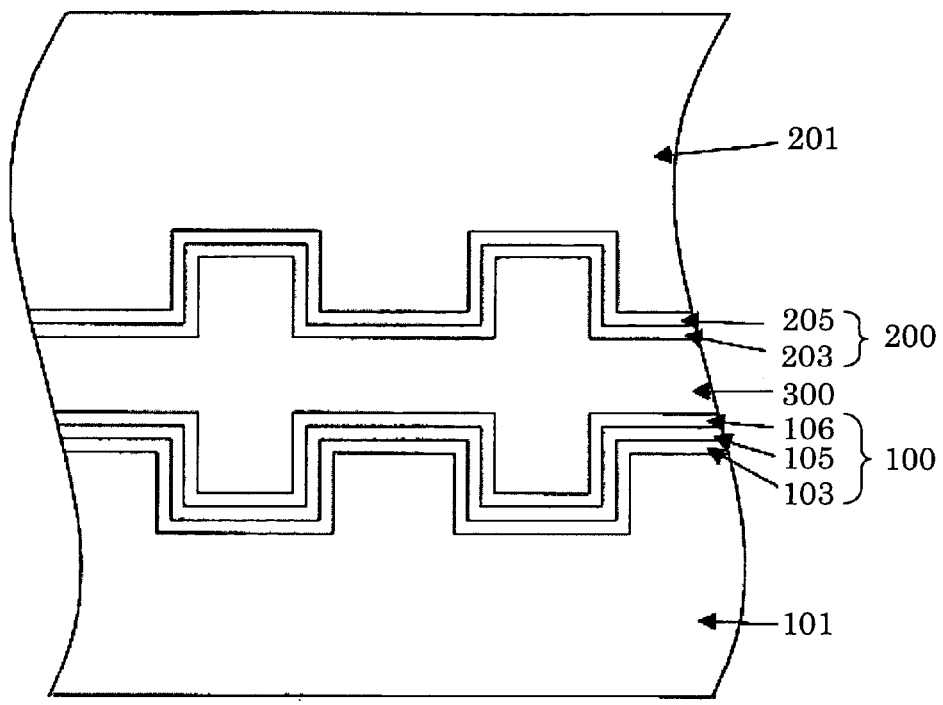
FIG. 1 is an outlined cross-sectional view of an illustrative embodiment of one-side multilayer, recordable optical recording medium according to the present invention.

The present invention will be explained in detail below.

The reading of optical grooves is performed by a servo optical detector which is divided in two in a radius direction of the optical disc receiving reflected light of the light spot which is being integrally moved with a head or a pick up and the output I1 of the first optical detecting part and the output I2 of the second optical detecting part are arithmetically processed in the signal processing circuit.

When focus position of the beam is misaligned from the center of tracking, push-pull signal output shows corresponding curve. According to DVD+R and DVD+RW standards, push-pull signal intensity prior to recording is in a range of 0.30 to 0.60 and 0.28 to 0.56 respectively.

However, modulation deterioration, jitter degradation by repeated recording, insufficient sensitivity of the second information layer, and the like occur in a disc in which the push-pull signal intensity of both of the first information layer and the second information layer are in above range. The reason is not necessarily clear, however, it is considered to be related with the groove shape, because push-pull signal intensity is greatly affected by the groove shape. When the groove depth is relatively shallow, as the groove becomes shallower, the push-pull signal intensity becomes smaller.

If the groove is too shallow, it is impossible to obtain modulation and jitter is increased affected by adjacent track. If the groove is too deep, reflectance is deteriorated or the jitter increase by repeated recording is accelerated. When the groove width is too wide, it is also impossible to obtain modulation and the jitter increase by repeated recording is accelerated. When width is too narrow, tracking becomes unstable and especially if the groove width of the first information layer becomes too narrow, the balance between reflectance and transmittance is altered and the problem such as decrease in transmittance arises.

As a result of investigation, it was found that to have a one-side multilayer optical disc of excellent recording and reproducing property, when the wavelength of the laser beam being λ nm, refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following condition should be satisfied for the recordable optical recording medium.

$$4\lambda/16n_1 \leq d_1 \leq 7\lambda/16n_1$$

$$\lambda/16n_2 \leq d_2 \leq 3\lambda/16n_2 \text{ or } 4\lambda/16n_1 \leq d_1 \leq 7\lambda/16n_1$$

$$0.2 \leq w_1/p_1 \leq 0.55$$

$$0.2 \leq w_2/p_2 \leq 0.55$$

And the following condition must be satisfied for the phase-change optical recording medium.

$$0.9\lambda/16n_1 \leq d_1 \leq 3\lambda/16n_1$$

$$0.9\lambda/16n_2 \leq d_2 \leq 3\lambda/16n_2$$

$$0.2 \leq w_1/p_1 \leq 0.6$$

$$0.2 \leq w_2/p_2 \leq 0.6$$

$d_1$ is preferably satisfying the condition, $\lambda/16n_1 \leq d_1 \leq 3\lambda/16n_1$ and $d_2$ is preferably satisfying the condition, $\lambda/16n_2 \leq d_2 \leq 3\lambda/16n_2$.

In addition, excellent recording property in a comprehensive manner could be obtained when push-pull signal intensity satisfied following condition, when the push-pull value of the first information layer prior to recording being PP1 and the push-pull value of the second information layer prior to recording being PP2.

$$0.30 \leq PP1 \leq 0.70$$

$$0.25 \leq PP2 \leq 0.60$$

$$0.6 \leq PP1/PP2 \leq 1.4$$

When the push-pull value is larger than above range, stable focus of each layer becomes difficult due to deteriorated reflectance, etc. When the push-pull value is smaller than above range, tracking may be unstable or transmittance of the first information layer may be deteriorated.

Furthermore, if PP1/PP2 is in a range of 0.6 to 1.4, when the pick up jumps from the first information layer to the second information layer during data reading, for example, tracking is not deviated and the reading can be performed smoothly.

It is conventionally known that the optimal value of the groove depth can be expressed by a relational formula with the laser wavelength λ, because phase difference between the reflected light from the groove side and the reflected light from the land side is deeply involved with the push-pull value. However, as a result of the dedicated investigation by the inventor, it was found that the laser wavelength λ in a range of 350 nm to 750 nm is preferably within the range prescribed in the present invention 1 and 5 for the multilayer optical recording medium of the present invention. This finding is a new matter which is not mentioned in known literatures as mentioned before.

And the present invention 1 and 5 are prescribed by the formula including laser wavelength λ, however, optical recording medium in general is designed with specified range of the laser wavelength used for recording and reproducing. If it is in a range of 350 nm to 750 nm, because the groove depth is decided by the laser wavelength for recording and reproducing specified by the nature of optical recording medium, the composition of the optical recording medium will never be infinite when the laser wavelength λ is included in the composition requirement.

Among others, the present invention is preferably in a range prescribed in the present invention 1 and 5, when the red laser wavelength as used for DVD+R is in a range of 630 nm to 680 nm or when the blue laser wavelength is in a range of 390 nm to 420 nm.

Reflectance of unrecorded part of the phase-change optical recording medium is preferably 18% to 30% and more preferably 18% to 25% in terms of the compatibility with one-side multilayer DVD-ROM. In case of the phase-change optical recording medium, when the reflectance of non-grooved part of a disc is more than 20%, obtaining a disc having a large contrast in the recording signal becomes difficult. On the other hand, when the reflectance is small, all the signal intensity is also small; therefore too small reflectance will not do either. Consequently, the reflectance of mirror surface part is preferably 4% to 20% and more preferably 6% to 12%.

DPD signal is preferably 0.3 or more for both recordable and phase-change optical recording medium. For the tracking method for reproducing-only optical disc apparatus, DPD method (Differential Phase Detection) is utilized. In consequent, if DPD signal is less than 0.3, tracking by reproducing-only optical disc apparatus becomes unstable and likely to induce tracking deviation.

FIG. 1 is an outlined sectional view of an illustrative embodiment of one-side multilayer, recordable optical recording medium of the invention.

The optical recording medium for recording and reproducing, as shown in FIG. 1, has two information layers. Each information layer is formed using organic dye material. Recording of information in each information layer is performed by irradiating a laser beam from the first substrate side and recording a pattern called mark.

In particular, the first information layer 100 is formed on the first substrate 101 having a guiding groove. The first information layer 100 may be a single layer of the first recording layer 103 or a laminated composition of the first reflective layer 105 on the first recording layer. Furthermore, a transparent first thermodiffusion layer 106 may be disposed on the first reflective layer. And undercoat layer or protective layer (not shown in figures) may be disposed between the first recording layer 103 and the first substrate 101 and these may be a laminated composition for better function.

On the other hand, the second information layer 200 is formed on the second substrate 201 having a guiding groove. The second information layer 200 may be a single layer of the second recording layer 203 or a laminated composition of the second reflective layer 205 and the second recording layer 203. And undercoat layer or protective layer (not shown in figures) may be disposed between the second recording layer 203 and the intermediate layer 300 and these may be a laminated composition for better function.

The first information layer 100 and the second information layer 200 are separated by a predetermined distance with almost transparent intermediate layer 300 (adhesive layer) and are bonded in a position facing each other.

A guiding groove may be formed in the intermediate layer 300 and the second information layer may be formed above the layer, depending on the manufacturing method.

Examples of material for the first substrate include transparent resins such as polycarbonate, acrylic resin, polyolefin, and the like or transparent glass. Of these, polycarbonate resin is most suitable material because of the actual performance of being most broadly used for CD, etc. and also of being obtainable with a reasonable price. A groove of a guiding pitch for recording and reproducing light may be formed on the first substrate as necessary. The thickness of the first substrate is preferably about 0.6 mm±0.1 mm.

The same material as for the first substrate may be used for the material of the second substrate, and an opaque material for recording and reproducing light may be used. And the material and groove shape may be different from that of the first substrate. The thickness of the second substrate is not limited; however, the thickness of the second substrate is preferably selected so that the total thickness of the first and second substrates becomes 1.2 mm. A guiding groove may be formed on the side where the second information layer is formed.

The intermediate layer has preferably a small light absorption at a wavelength of the irradiated light for recording and reproducing. Examples of the material include ultraviolet curing resin, delayed-action resin, thermoplastic resin, and the like that are suitable in terms of moldability and cost. A two-sided tape for bonding optical disc (adhesive sheet DA-8320 by Nitto Denko Corporation) may also be used. A guiding groove for recording and reproducing light may be formed in the intermediate layer as in the first substrate.

The intermediate layer enables the pick up to recognize the first information layer and the second information layer and optically separate during recording and reproducing, and the thickness is preferably 10 μm to 70 μm. If it is thinner than 10 μm, cross talk between layers occur, and if it is thicker than 70 μm, a spherical aberration occurs during recording and reproducing of the second information layer and recording and reproducing may become difficult. The more preferable range is 40 μm to 70 μm.

Next, the first recording layer 103 and the second recording layer 203 will be explained.

Optical property is a necessary item for making up the recording layer of an optical recording medium. The necessary condition for optical property is having a broad absorption band at a short wavelength side of the recording/reproducing wavelength and the recording/reproducing wavelength is near the long wavelength end of the absorption band. This indicates that at the recording/reproducing wavelength, refraction index and extinction coefficient are significant. In particular, refraction index "n" of a single recording layer at the recording/reproducing wavelength is preferably in a range of $1.5 \leq n \leq 3.0$ and extinction coefficient "k" is preferably in a range of $0.02 \leq k \leq 0.2$. When above condition is satisfied, stable recording and reproducing of high sensitivity and high modulation are possible. However, when "n" is less than 1.5, it is difficult to obtain sufficient optical change and the degree of recording modulation becomes low, therefore not favorable. When "n" is more than 3.0, wavelength dependence becomes too high and causes errors even in a region of recording/reproducing wavelength, therefore not favorable. In addition, when "k" is less than 0.02, recording sensitivity is deteriorated and it is not favorable and when "k" is more than 0.2, it becomes difficult to obtain reflectance of 18% or more and in particular, transmittance of the first information layer becomes too low deteriorating the recording sensitivity of the second information layer, therefore not favorable.

Next, specific examples of organic dye material usable for recording layer include azo metal-chelate dye, formazan metal-chelate dye, dipyromethene metal-chelate dye, polymethine dye, squarylium dye, azaanulene dye, and the like and metal-chelate dye, torimethinecyanine dye, squarylium dye, tetraazaporphyrin dye are favorable.

Examples of azo metal-chelate dye include metal-chelate compounds of azo compounds of which azo compound forming unit on both sides that are bookending azo bonding has a combination of substituted/unsubstituted aromatic rings, pyridine residue, pyrimidine residue, pyrazine residue, pyridazine residue, triazine residue, imidazole residue, triazole residue, pyrazole residue, thiazole residue, isothiazole residue, benzthiazole residue, and the like.

In addition, a chelate compound of formazan compound and bivalence metal atom as expressed in following Formula 1 is favorable as a formazan metal-chelate dye.

Formula 1

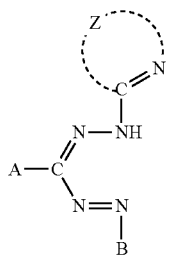

(In Formula 1, "Z" represents a residue forming a heterocycle with its bonding carbon atom and nitrogen atom and in particular, pyridazine cycle, porimidine cycle, pyrazine cycle, or triazine cycle. And these heterocycles may have substituted group of alkyl group, alkoxy group, alkylthio group, substituted amino group, aryl group, allyloxy group, anilino group, keto group, and the like. "A" represents alkyl group, aralkyl group, allyl group or cyclohexyl group and may have substituted group of halogen atom, alkyl group, alkoxy group, keto group, carboxyl group or ester thereof, nitrile group, nitro group, and the like. "B" represents allyl group and may have substituted group of halogen atom, alkyl group, alkoxy group, carboxyl group or ester thereof, nitrile group, nitro group, and the like.)

Formula 2

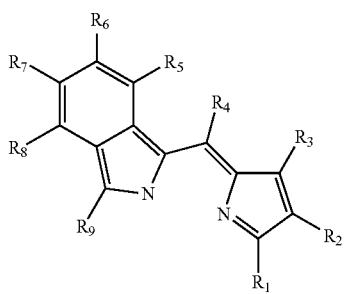

(In Formula 2, each $R_1$ to $R_9$ independently represent hydrogen atom, halogen atom, substituted/unsubstituted alkyl group, alkoxy group, alkenyl group, acyl group, alkoxycarbonyl group, aralkyl group, aryl group or heteroaryl group.)

Examples of metals that form above azo compound, formazan compound, dipyromethene compound and chelate compound include Ni, Co, Cu, Mn, V, Zn, Fe, Cr, Al, and the like and in particular, Ni, Co, Cu, Mn and V are suitable in terms of production and disc property.

Polymethine dyes having absorption band at 530 nm to 600 nm are usable, however, it is preferably trimethine cyanine dye and in particular, of which both ends of trimethine chain consist of substituted/unsubstituted indolenine or benzindolenine.

Various metal-chelate anions as typified by nickel dithiolate complex may be used as a counter anion besides halogen anion, $ClO_4^-$, $BF_4^-$, $PF_6^-$, $SbF_6^-$, and the like.

Squarylium dye is preferably a combination of indolenine and benzindolenine of which both ends of squalene ring are substituted/unsubstituted, pyrazole, carbazole, quinoxaline, isoindole, aroma ring or substituent amino group residue.

Examples of azanulene dye include phthalocyanine, naphthalocyanine, tetrapyrazinoporphyrazine, tetrapyridino porphyrazine, tetraazaporphyrin, and the like, each having specific substituent group. Of these examples, tetraazaporphyrin is most preferable followed by tetrapyridino porphyrazine, tetrapyrazinoporphyrazine and phthalocyanine that are preferred in this sequence.

With regard to pyrolysis property of above dyes, whether dye is used alone or in mixture, the decomposition starting temperature of its recording material is preferably 360° C. or less and in particular, 100° C. to 350° C. When the decomposition temperature is more than 360° C., a pit formation is not performed satisfactory during recording and jitter property is deteriorated. When it is less than 100° C., storage stability of the disc is deteriorated.

In addition, above dyes may be used in a combination or in a laminated condition with other organic dyes, metals and metal compounds for improving optical property, recording sensitivity, signal property, and the like.

Examples of such organic dyes include (poly)methane dye, various dyes of naphthalocyanines, phthalocyanines, squaryliums, chloconiums, pyryliums, naphthoquinones, anthraquinones (indanethrenes), xanthenes, triphenylmethanes, azulenes, tetrahydrocholines, phenanthrenes, triphenothiazines, and metal complex compounds.

Examples of metal and metal compounds include In, Te, Bi, Se, Sb, Ge, Sn, Al, Be, $TeO_2$, SnO, As, Cd, and the like and each may be used in a dispersion mixing or laminated condition.

Moreover, various polymer materials such as ionomer resin, polyamide resin, vinyl resin, natural polymer, silicone, liquid rubber, and the like or silane coupling agent, and the like may be dispersion mixed in above dyes and used with stabilizer (transition metal complex, for example), dispersant, flame retardant, lubricant, antistatic agent, surfactant, plasticizer, and the like for property improvement.

Normally used method including vapor deposition, sputtering, CVD (chemical vapor growth deposition) and solvent coating may be used for forming an organic dye recording layer.

When employing a coating method, above dyes, and the like are dissolved in organic solvent and commonly used coating method such as spraying, roller coating, dipping, spin coating, and the like may be used. Organic solvent that are used generally are alcohols such as methanol, ethanol, isopropanol, and the like; ketones such as acetone, methylethylketone, cyclohexane, and the like; amides such as N, N-dimethylformamide, N, N-dimethylacetamide, and the like; sulfoxides such as dimethylsulfoxide, and the like; ethers such as tetrahydrofuran, dioxane, diethyl ether, ethyleneglycol monomethylether, and the like; esters such as methyl acetate, ethyl acetate, and the like; aliphatic halide hydrocarbons such as chloroform, methylene chloride, dichloroethane, carbon tetrachloride, trichloroethane, and the like; aromatic series such as benzene, xylene, monochlorobenzen, dichlorobenzene, and the like; cellosolves such as methoxyethanol, ethoxyethanol, and the like; hydrocarbons such as hexane, pentane, cyclohexane, methylcyclohexane, and the like.

Thickness of the recording layer is 10 nm to 10 µm and preferably 20 nm to 200 nm.

Undercoat layer is used for the purposes of (1) improving adhesiveness, (2) setting a barrier against water or gas, (3) improving storage stability of recording layer, (4) improving reflectance, (5) protecting substrate from solvent, (6) forming guiding groove, guiding pit, preformat, and the like.

For the purpose (1), for example, various polymer compounds such as ionomer resin, polyamide resin, vinyl resin, natural resin, natural polymer, silicone, liquid rubber, and the like and silane coupling agent may be used. For the purposes (2) and (3), inorganic compounds such as SiO, MgF, $SiO_2$, TiO, ZnO, TiN, SiN, and the like may be used besides above polymer materials and furthermore, metals or semimetals such as Zn, Cu, Ni, Cr, Ge, Se, Au, Ag, Al, and the like may also be used. For the purpose (4), metals such as Al, Au and Ag, and the like or metallic organic thin films such as methane dye, xanthene dye, and the like may be used. For the purposes (5) and (6), ultraviolet curing resin, thermoset resin, thermoplastic resin, and the like may be used.

Thickness of the undercoat layer is 0.01 µm to 30 µm and it is preferably 0.05 µm to 10 µm.

Metals and semimetals which exhibit high reflectance alone and have anti-corrosive property are suitable for material of the reflective layers and specific examples include Au, Ag, Cr, Ni, Al, Fe, Sn, and the like and Au, Ag and Al are the most preferable in terms of reflectance and productivity. These metals and semimetals may be used alone or in combination of two.

Because the first information layer particularly requires high transmittance, it is preferable to use Ag or alloy thereof having low refraction index and high heat conductivity for the first reflective layer.

Film-forming method for the reflective layer includes vapor deposition, sputtering, and the like.

Thickness of the second reflective layer is 3 nm to 500 nm and preferably 3 nm to 300 nm. It is preferably 3 nm to 20 nm for the first reflective layer. If it is less than 3 nm, forming a dense film of uniform thickness is difficult. If the thickness of the second reflective layer is more than 500 nm, interface shape between the second reflective layer and the second recording layer would be significantly different from the groove shape of the substrate. If the thickness of the first reflective layer is more than 20 nm, transmittance decreases and the sensitivity of the second information layer is likely to be deteriorated.

Protective layers are used for the purposes of protecting from heat damage of the recording layer (reflection absorption layer), improving storage stability of the recording layer (reflection absorption layer), improving reflectance, reducing the cross-talk, and the like. The materials of the undercoat layer described above may be used for these purposes. In addition, SiO, $SiO_2$, and the like may be used as inorganic material and thermosoftening, thermoplastic resins such as polymethylacrylate resin, polycarbonate resin, epoxy resin, polystyrene resin, polyester resin, vinyl resin, cellulose resin, aliphatic hydrocarbon resin, natural rubber, styrenebutadiene resin, chloroprene rubber, wax, alkyd resin, drying oil, rosin, and the like may also be used. Of these materials, inorganic materials such as ZnS, $SiO_2$, and the like are most suitable.

Thickness of the protective layer is 0.01 µm to 30 µm and it is preferably 0.05 µm to 10 µm. In the undercoat layer or protective layer, stabilizer, dispersant, flame retardant, lubricant, antistatic agent, surfactant, plasticizer, and the like may be contained as in the recording layer.

The first thermodiffusion layer may be disposed on the first reflective layer of one-side, multilayer recordable optical recording medium of the invention. The first reflective layer must be extremely thin in terms of transmittance; however, if the first reflective layer is thin, heat is retreated to the organic dye recording layer due to lack of heat capacity and forming a microscopic mark becomes difficult. And so the first thermodiffusion layer is disposed to compensate for the lack of heat capacity of the first reflective layer. The first thermodiffusion layer of good heat conductivity is desired for quenching the organic dye recording layer which has been irradiated with a laser beam. Moreover, it is also desired to have small absorptance at a laser wavelength to make recording and reproducing of the information layer in the back possible.

The extinction coefficient at a laser wavelength used for recording and reproducing of information is preferably 0.5 or less and more preferably 0.3 or less. If it is more than 0.5, absorptance of the first information layer is increased and recording and reproducing of the second information layer become difficult.

The refraction index at a laser wavelength used for recording and reproducing of information is preferably 1.6 or more. If it is less than 1.6, it becomes difficult to increase the transmittance of the first information layer.

For above reasons, it preferably contains at least one of nitride, oxide, sulfide, nitride oxide, carbide and fluoride. Examples include AlN, $Al_2O_3$, SiC, SiN, $SnO_2$, $In_2O_3$, ZnO, ITO (indium oxide-tin oxide), IZO (indium oxide-zinc oxide), ATO (tin oxide-antimony), DLC (diamond-like carbon), BN, and the like.

The first thermodiffusion layer may be formed by various vapor growth methods such as vacuum deposition, sputtering, plasma CVD, optical CVD, ion plating, electron beam deposition, and the like. Of these examples, sputtering excels in productivity, film quality, and the like.

Thickness of the first thermodiffusion layer is preferably 10 nm to 200 nm. If it is thinner than 10 nm, heat dissipation effect cannot be obtained. If it is thicker than 200 nm, stress is increased thereby causing a problem in productivity as well as deteriorating repeated recording property.

Figure 2:
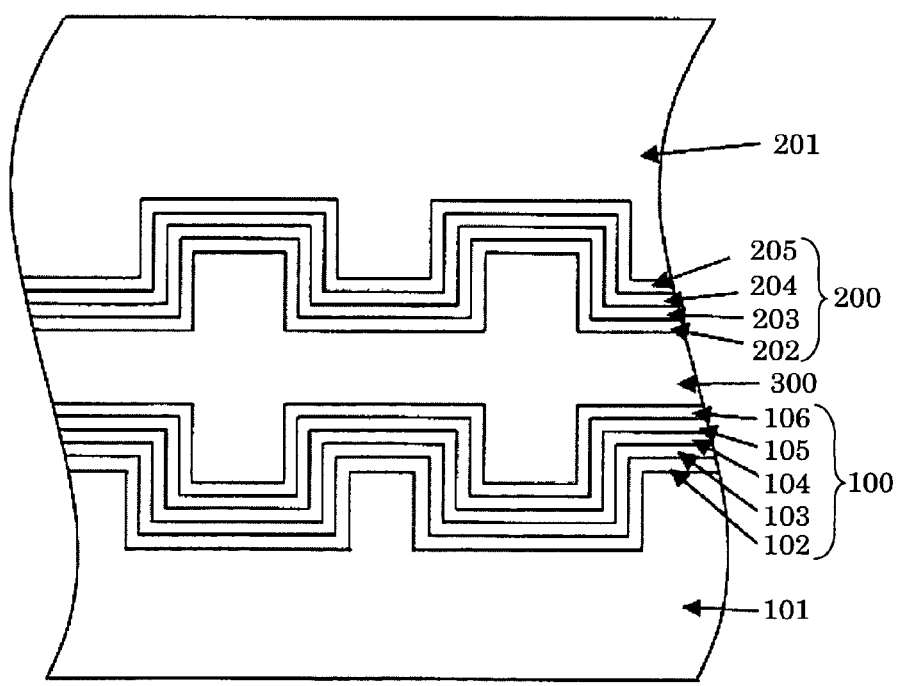
FIG. 2 is an outlined cross-sectional view of an illustrative embodiment of one-side multilayer, phase-change optical recording medium according to the present invention.

FIG. 2 is an outlined cross-sectional view of other illustrative embodiment of one-side multilayer, phase-change optical recording medium of the invention. The recording and reproducing type of optical recording medium as shown in FIG. 2 has two information layers. Each information layer is formed using materials of which optical properties changes between amorphous and crystal (so-called "phase-change recording material"). Information is recorded to each information layer by irradiating a laser beam from the first substrate and recording patterns called mark similarly to FIG. 1. More specifically, the first information layer 100 is formed on the first substrate 101 having a guiding groove. The first information layer is at least composed of the first recording layer 103 which consist of the phase-change recording material and formed as if being sandwiched in between the transparent first lower protective layer 102 and the transparent first upper protective layer 104 with the semitransparent first reflective layer 105 laminated on it. Furthermore, the transparent first thermodiffusion layer 106 may be disposed on the reflective layer 105.

On the other hand, the second information layer 200 is formed on the second substrate 201 having a guiding groove. The second information layer 200 is composed of the laminated second recording layer 203 which consist of phase-change recording material and formed as if being sandwiched in between the second reflective layer 205, transparent second lower protective layer 202 and the transparent second upper protective layer 204.

The first information layer 100 and the second information layer 200 are separated by predetermined distance from almost transparent intermediate layer 300 (adhesive layer) and bonded in a position facing each other. These information layers are formed along the shape of guiding groove on the substrate surface and the recording layers in the information layer are also formed along the shape of guiding groove, therefore recording layer also has a guiding groove.

Each layer is explained in sequence below, however, explanations for the first substrate 101, the second substrate 102 and the intermediate layer 300 are omitted because they are identical to the ones in FIG. 1.

Next, the first recording layer and the second recording layer are explained.

The first recording layer 103 and the second recording layer 203 as shown in FIG. 2 are phase-change recording layers, and the preferable range of thickness differ between the first recording layer and the second recording layer and it is preferably 3 nm to 20 nm for the first recording layer. If it is thinner than 3 nm, it is difficult to form a film of uniform thickness and it is also likely to slow down the crystallization speed, thereby making it difficult to erase in a short period of time. On the other hand, if it is more than 20 nm, transmittance is decreased and the sensitivity of the second information layer is deteriorated. It is preferably 15 nm or less from the viewpoint of transmittance. The thickness of the second information layer is preferably in a range of 3 nm to 100 nm. If it is thinner than 3 nm, the same problem happens as in the first recording layer. If it is more than 100 nm, it is difficult to obtain optical contrast and cracks are more likely to appear.

For high-density recording of which the shortest mark length is 0.5 µm or less, the thickness of the second recording layer is preferably 3 nm to 25 nm. If it is less than 3 nm, reflectance become too low, and it is likely to cause nonuniform composition in a primary phase of the film growth and rare effect of the film, therefore not favorable. On the other hand, if it is thicker than 25 nm, crystal growth becomes more like three-dimensional and the edge of amorphous marks is disturbed making jitter more likely to increase, besides increasing heat capacity and deteriorating the recording sensitivity. Furthermore, the volume change by the phase change of the second recording layer become distinguishable and repeated overwrites (O/W) durability is deteriorated, therefore not favorable. It is preferably 20 nm or less from the viewpoint of durability of mark-edge jitter and repeated overwrites (O/W).

Density of the first and the second recording layers are 80% or more of bulk density and are preferably 90% or more. To increase the density in film-forming by sputtering, it is required to decrease the sputtering gas pressure (noble gas such as Ar, etc.) during film-forming, or increase the amount of high-energy Ar irradiated to the recording layer by disposing the substrate near the front of the target. High-energy Ar is either Ar ion that is being irradiated to the target for sputtering of which part of it is bounced back to reach the substrate side or Ar ion in the plasma which is accelerated by sheath voltage of the entire surface of the substrate to reach the substrate. Such irradiation effect of high-energy noble gas is called "atomic peening effect". In sputtering of Ar gas generally used, Ar is mixed in the sputtering film by atomic peening effect. The atomic peening effect may be estimated by Ar amount mixed in the film. In other words, small Ar amount means small irradiation effect of high-energy Ar and it is likely to form a film of less density. On the other hand, when Ar amount is large, irradiation of high-energy Ar is intense and the density goes up, however, Ar which has been mixed in the film is deposited as void during repeated overwrites (O/W) and durability is deteriorated. The appropriate Ar amount in the recording layer films is 0.1 atomic % to 1.5 atomic %. Furthermore, it is preferable to use high-frequency sputtering instead of direct-current sputtering, because it is possible to obtain high-density film with a small Ar amount.

For the phase-change material used in the first and the second recording layers, it is preferable to use alloy of which main composition element consist of Sb and Te which are expressed by the Formula prescribed in the present invention (7). For additive element, Ge is preferable in terms of storage stability and strong contrast ratio. Further, by adding at least 0.1 atomic % to 5 atomic % of one element selected from O, S, N to each recording layer, optical constant of recording layers may be finely adjusted. However, adding more than 5 atomic % is not preferable because crystallization speed is slowed and erasing function is deteriorated.

In order to increase stability over time without lowering the crystallization speed during overwrite, it is preferable to add 8 atomic % or less of at least one element selected from V, Nb, Ta, Cr, Co, Pt and Zr and more preferable loadings is 0.1 atomic % to 5 atomic %. The total loading of above additional element and Ge is preferably 15 atomic % or less relative to SbTe. If more than 15 atomic % is contained, it induces the phase separation besides Sb. In particular, when content of Ge is 3 atomic % to 5 atomic %, the additional effect is great.

Alternatively, for improvement of stability over time and fine adjustment of refraction index, it is preferable to add 5 atomic % or less of at least one element selected from Si, Sn, Pb. The total loading of these additional element and Ge is preferably 15 atomic % or less. Meanwhile, each element, Si, Sn and Pb is an element having four coordinate network same as Ge.

Also, by adding 8 atomic % or less of Al, Ga and In, effects of decreasing jitter and improving recording sensitivity as well as increasing crystallization temperature can be obtained, however, segregation is also likely to occur, therefore, it is preferably 6 atomic % or less. Each loading of Al, Ga and In, as total loading with Ge, is 15 atomic % or less and preferably 13 atomic % or less.

Moreover, adding 8 atomic % or less of Ag has an effect of improving recording sensitivity and in particular, the effect is notable when Ge atomic amount is more than 5 atomic %. However, if loading of Ag is more than 8 atomic %, jitter is increased and stability of amorphous mark is deteriorated, therefore not preferable. In addition, it is not preferable for total loading with Ge to be more than 15 atomic %, because it is likely to induce segregation. The most preferable content of Ag is 5 atomic % or less. In addition, for other phase-change material used for the first and the second recording layers, it is preferably alloy of which the main composition element consist of Ge, Sb and Te which are expressed by composition Formula prescribed in the present invention 8. This composition Formula shows that $100 \times x/(2x+y+3)$ atomic % of Ge and M2 are contained in total. In order to obtain optical recording medium of excellent repeated recording capability, "A" is preferably satisfying $2 \leq A \leq 10$. By solid dispersing SnTe, PbTe or $Bi_2Te_3$ in GeTe—$Sb2Te_3$ pseudobinary system composition, it is possible to increase the crystallization speed.

The condition of the first and the second recording layers after film-forming in general is amorphous. Consequently, it is required to crystallize the entire surface of each recording layer after film-forming to make an initial condition (unrecorded condition). Initialization by annealing in a solid phase is possible for initialization method, however, it is preferably an initialization by melting recrystallization in which recording layer is temporarily melted and crystallized by being gradually cooled during resolidification. There is almost no nucleus for crystal growth in the first and the second recording layers immediately after film-forming and crystallization in solid phase is difficult, however, by melting recrystallization, it is melted after a small number of crystal nucleus is formed and recrystallization mainly consist of crystal growth is progressed at high speed. Because refraction index of the crystal generated by melting recrystallization differs from refraction index of the crystal generated by annealing in a solid phase, it causes noises when mixed. And because during actual overwrite (O/W) recording, erasing part become a crystal by melting recrystallization, it is also preferable to perform the initialization by melting recrystallization.

When performing initialization by melting recrystallization, melting of recording layer is preferably performed locally in a short period of time such as one millisecond or less. The reason for this is because of the wide melting region, possible destruction of each layer or deformation of the surface of plastic substrates by heat occurs if melting time or cooling time is too long. To give a thermal history suitable for initialization, it is preferable to irradiate high-power laser diode beam of approximately 600 nm to 1,000 nm wavelength, focusing it to long axis of 100 μm to 300 μm and short axis of 1 μm to 3 μm and scan at a linear velocity of 1 m/s to 10 m/s with short axis being a scanning axis. If it is close to circular form, it is not preferable because melting region is too wide and likely to induce another amorphousization and also damages to the laminated composition or substrate are significant even with the same focusing beam.

It is possible to confirm if the crystallization is performed by melting recrystallization as follow.

More specifically, a recording beam which is focused into a small spot with a diameter of approximately less than 1.5 μm at a recording power Pw, an enough power to melt the recording layer, is irradiated to an initialized medium at a certain linear velocity by direct current. If there is a guiding groove, it should be performed while driving tracking servo and focusing servo to the tracks of the groove or between grooves. Then, if the refraction index of erasing condition obtained by irradiating an erasing beam at an erasing power Pe ($\leqq$Pw) on the same track is almost equal to the refraction index of initial condition with no recording, the initialization condition is confirmed as a condition of melting recrystallization. Because recording layer is temporarily melted by recording beam irradiation and completely recrystallized condition created by erasing beam irradiation has been processed with melting by recording beam and recrystallization by erasing beam, it is a condition of melting recrystallization. In addition, refraction index of initial condition "Rini" and refraction index of melting recrystallization condition "Rcry" are said to be almost the same when the refraction difference between both sides which is defined as (Rini−Rcry)/{(Rini+Rcry)/2} is 20% or less. The difference of these refraction indexes in general is more than 20% with only solid phase crystallization such as annealing, and the like.

The first recording layer is disposed on the groove-forming surface of the first substrate in a composition as such that it is inserted in between the first upper protective layer and the first lower protective layer. The second recording layer is disposed on the groove-forming surface of the second substrate in a composition as such that it is inserted in between the second upper protective layer and the second lower protective layer.

The first and the second lower protective layers are effective mainly in preventing deformation of the first and the second recording layers caused by high temperature during recording. And they also have capabilities of preventing interdiffusion between recording layer and reflective layer and releasing heat efficiently to the first and the second reflective layers while controlling the deformation of the first and the second recording layers.

The material of the protective layers are decided considering refraction index, heat conductivity, chemical stability, mechanical strength, adhesiveness, and the like. In general, metals that have high transparency and high melting point, oxide, sulfide, nitride and carbide of laser diode or fluorides such as Ca, Mg, Li, etc. may be used, however, as a result of the investigation over various materials by the inventor, it was concluded that the most suitable material is a mixture of ZnS and $SiO_2$, considering above viewpoints and consistency with materials composing the first and the second recording layers of the invention. Meanwhile, above oxide, sulfide, nitride, carbide and fluoride do not necessarily have to have stoichiometric composition and it is also effective to use them while controlling and mixing the composition to adjust refraction index, etc.

The function, etc. of the protective layers are explained furthermore.

The layer composition of the invention belongs to one of the layer compositions called quenching structure. Quenching structure accelerates heat dissipation and employs a layer composition which increases the cooling rate during re-solidification of the recording layer to realize high erasing ratio by high-speed crystallization while avoiding the problem of recrystallization during amorphous-mark forming. For this reason, the thickness of the first and the second upper protective layers is 5 nm to 30 nm. If it is thinner than 5 nm, it is likely to be destructed by deformation, etc. during melting of the recording layer, and the power needed for recording become unnecessary high due to too much heat dissipation effect.

Furthermore, the thickness of upper protective layers significantly affects durability of repeated overwrites and it is also important for controlling the deterioration of the jitter in particular. When the thickness is thicker than 30 nm, the temperature difference between recording layer side and reflective layer side of the upper reflective layer becomes large during recording and unsymmetrical deformation of entire protective layer is likely to occur from the thermal expansion difference of both ends of the protective layer. Repetition of these let microscopic and plastic deformation to accumulate inside the protective layer and invite noise increase, therefore not preferable.

It is possible to realize low jitter in high-density recording with the shortest mark length of 0.5 μm or less by using the phase-change recording material such as above, however, from the investigation by the present inventor, when using the laser diode of short wavelength (wavelength of 700 nm or less, for example) to realize high-density recording, it is needed to pay more attention to the layer composition of above quenching construction. In particular, when investigating one beam overwrite property using small focusing beam of 500 nm wavelength and 0.55 numerical apertures (NA), it has been known that equalization of temperature distribution in mark width direction is important to obtain wide high erasing ratio and high power margin.

The similar tendency may be seen for DVD compatible optical system using optical system of 630 nm to 680 nm wavelength and NA=0.6. Recording of high-density, mark length modulation using this kind of optical system uses upper protective layer of particularly low heat conductivity. The thickness is preferably 10 nm to 25 nm. In either case, erasing ratio and erasing power margin can be improved by employing a reflective layer of high heat conductivity material which is disposed on the upper protective layer. By investigation, it is preferable to employ a layer composition which can equalize the temperature distribution in a film surface direction (vertical direction of the recording-beam scanning direction) as much as possible as well as equalizing temperature distribution in thickness direction or in time variation in order to bring out good erasing property of the phase-change recording layer in a wide range of erasing power.

The inventor has tried to widen the area which can be recrystallized without being melted and amorphousized again and widen the erasing ratio and erasing power margin by designing layer composition of the optical recording medium appropriately to equalize temperature distribution in a track crossing direction within medium. On the other hand, it was found that the temperature distribution in the recording layer is equalized by stimulating the heat dissipation from the recording layer to the reflective layer of extremely high heat conductivity through very thin upper protective layer of low heat conductivity. Heat dissipation effect is also stimulated by increasing the heat conductivity of upper protective layer, however, if too much heat dissipation is stimulated, irradiation power needed for recording becomes high and recording sensitivity is significantly deteriorated.

It is preferable to use thin upper protective layer of low heat conductivity for the invention. Because this would give a temporal delay to the heat conductance from the recording layer to the reflective layer for a several nanoseconds to dozens of nanoseconds at a starting point of the recording power irradiation and stimulate the heat dissipation to the reflective layer afterward, the recording sensitivity is not unnecessary deteriorated by heat dissipation. The heat conductivity of the protective layer material mainly consist of conventionally known $SiO_2$, $Ta_2O_5$, $Al_2O_3$, AlN, SiN, and the like is too high and not favorable for the first and the second upper protective layer by itself.

On the other hand, heat dissipation at the reflective layer, in case of the second information layer, for example, can be achieved even by thickening the second reflective layer, however, if the thickness of the second reflective layer is more than 300 nm, heat conductance in thickness direction become more distinguishable than in film-surface direction of the second recording layer and improving effect of temperature distribution in film-surface direction cannot be obtained. Also, more cooling time is needed for the second reflective layer and the second recording layer as well, as the heat capacity of the second reflective layer itself is increased which inhibits amorphous mark forming. It is most preferable to dispose the second reflective layer of high heat conductivity thinly and selectively stimulate heat dissipation in lateral direction. The conventionally used quenching structure is only paying attention to one-dimensional heat escape in a thickness direction and is intended only to release heat rapidly from the second recording layer to the second reflective layer and is not paying enough attention to equalization of the temperature distribution in a flat-surface direction.

In addition, above "ultra-quenching structure considering delay effect of heat conductance in the upper protective layer" has more effect compared to conventional GeTe—$Sb_2Te_3$ recording layer when applied to the first and the second recording layers. This is because the rate controller of recrystallization of the first and the second recording layers is being the crystal growth during re-solidification near Tm. It is because ultra-quenching structure is effective for making amorphous mark and its edge forming certain and distinct by increasing the cooling rate near Tm to its extreme limit, and it is also possible to ensure erasing by recrystallization at higher erasing power by equalization of temperature distribution in film-surface direction as well as performing high-speed erasing near Tm which originally has been possible.

For materials of the first and the second upper protective layers, it is preferably having low heat conductivity and its rough standard is $1 \times 10^{-3}$ pJ/(μm·K·nsec). However, it is difficult to directly measure the heat conductivity of the low heat-conductivity material in thin-film condition and instead, a rough standard can be obtained from the result of heat simulation and measurement of actual recording sensitivity. Examples of upper protective layer material of low heat conductivity that gives favorable result include complex dielectrics containing 50 mole % to 90 mole % of at least one from ZnS, ZnO, $TaS_2$ and rare earth-sulfide and thermostable compounds with the melting point or decomposition point of 1,000° C. or more. Furthermore, it is preferably complex dielectrics containing 60 mole % to 90 mole % of rare earth-sulfide such as La, Ce, Nd, Y, and the like or 70 mole % to 90 mole % of ZnS and ZnO.

Examples of thermostable compound material with the melting point or decomposition point of 1,000° C. or more include oxide, nitride and carbide such as Mg, Ca, Sr, Y, La, Ce, Ho, Er, Yb, Ti, Zr, Hf, V, Nb, Ta, Zn, Al, Si, Ge, Pb, and the like or fluoride such as Ca, Mg, Li, and the like.

In particular, $SiO_2$ is favorable as a material which should be mixed with ZnS and this combination is considered to be the best in the invention.

The thickness of the first and the second upper protective layers is 5 nm to 30 nm as described above. It is preferably 25 nm or less. When it is thicker than 30 nm, sufficient equalization effect over temperature distribution in a mark width direction cannot be obtained. When it is less than 5 nm, delay effect of heat conductance in the upper protective layer part is insufficient and the recording sensitivity is significantly deteriorated therefore not favorable. The thickness of the first and the second upper protective layers are preferably 15 nm to 25 nm at a wavelength of the recording laser beam of 600 nm to 700 nm and 5 nm to 20 nm at 350 nm to 600 nm and most preferably 5 nm to 15 nm.

The thickness of the first and the second lower protective layers are preferably 30 nm to 200 nm. If it is less than 30 nm, the recording layer is likely to be deformed by the heat during recording. If it is thicker than 200 nm, a problem may arise in productivity. The thickness is designed in a way that most suitable refraction index is in these ranges.

It is also advantageous in terms of cost reduction in manufacturing when the upper protective layer and the lower protective layer are of the same material.

Next, the first reflective layer 105 and the second reflective layer 205 are explained.

The first and the second reflective layers have the functions such as effectively using incoming radiation and facilitating the amorphousization by improving cooling rate, etc. and metals of extremely high heat conductivity are employed for ultra-quenching structure which is an aspect of the invention. Specific examples of such metals include Au, Ag, Cu, W, Al, Ta, etc. and alloys thereof and Cr, Ti, Si, Pd, Ta, Nd, Zn, etc. are used as additional element.

Of these, materials of Ag series are especially favorable for material of the reflective layer in the first information layer because of small refraction index which can make the light absorption small.

Such reflective layer may be formed by various vapor growth methods, for example, vacuum vapor deposition, sputtering, plasma CVD, optical CVD, ion plating, and electron beam deposition, and among them, sputtering excels in terms of productivity and film quality, and the like.

Because the first information layer requires high transmittance, it is preferable to use Ag or Ag alloy of low refraction index and high heat conductivity for the first reflective layer. Moreover, the thickness is preferably in a range of 3 nm to 20 nm. When it is less than 3 nm, it is difficult to make a dense film of uniform thickness. If it is thicker than 20 nm, transmittance decreases and recording and reproducing of the second information layer 200 becomes difficult.

The thickness of the second reflective layer composing the second information layer is 50 nm to 300 nm and it is preferably 80 nm to 150 nm. When it is less than 50 nm, although pure Ag is used, the heat dissipation effect is insufficient therefore unsatisfactory for ultra-quenching structure without disposing further thermodiffusion layer on the second reflective layer. On the other hand, if it is more than 300 nm, heat escapes in perpendicular direction instead of horizontal direction and does not contribute for heat distribution improvement in horizontal direction, and the cooling rate of the second recording layer is decreased due to large heat capacity of the second reflective layer itself. And microscopic flatness of the film surface is also deteriorated.

In addition, it is also possible to dispose a barrier layer between the first upper protective layer and the first reflective layer and between the second upper protective layer and the second reflective layer. It is most preferable to use Ag alloy for reflective layers and a mixture of ZnS and $SiO_2$ for protective layers, however, when these two layers are adjacent to each other, sulfur in the protective layer may cause Ag of the reflective layer to corrode and storage reliability may be deteriorated. To overcome this problem, it is preferable to dispose a barrier layer when Ag system is used for the reflective layer. The barrier layer is not to contain sulfur, and the melting point should be higher than that of the recording layer. Specific examples include metal oxides such as $SiO_2$, ZnO, $SnO_2$, $Al_2O_3$, $TiO_2$, $In_2O_3$, MgO, $ZrO_2$, and the like; nitrides such as $Si_3N_4$, AlN, TiN, ZrN, and the like; carbides such as SiC, TaC, $B_4C$, WC, TiC, ZrC, and the like or mixtures thereof. These barrier layers are preferably having a small absorption rate at a laser wavelength.

Barrier layers may be formed by various vapor growth methods, for example, vacuum vapor deposition, sputtering, plasma CVD, optical CVD, ion plating, and electron beam deposition, and among them, sputtering excels in terms of productivity and film quality, and the like.

The thickness of barrier layer is preferably 2 nm to 10 nm. When it is less than 2 nm, prevention effect on Ag corrosion cannot be obtained and storage reliability is deteriorated. When it is thicker than 10 nm, quenching structure may not be obtained or transmittance is likely to be deteriorated.

Moreover, it is possible to dispose a first thermodiffusion layer on the first reflective layer. As mentioned above, the first reflective layer must be extremely thin from the viewpoint of transmittance, however, if the first reflective layer is thin, heat capacity is not sufficient and quenching the first reflective layer is difficult. It is preferable to dispose the first thermodiffusion layer to compensate heat capacity of the first reflective layer.

To quench the recording layer which has been irradiated with a laser beam, the first thermodiffusion layer is desired to have high heat conductivity. Additionally, it is desired to have a small absorption rate at a laser wavelength to make recording and reproducing of the information layer on the back possible. Extinction coefficient at a laser wavelength used for recording and reproducing of information is preferably 0.5 or less. Furthermore, it is preferably 0.3 or less. If it is more than 0.5, absorption rate of the first information layer increases and it becomes difficult to perform recording and reproducing of the second information layer. Alternatively, refraction index at a laser wavelength used for recording and reproducing of information is preferably 1.6 or more. When it is smaller than this, it is difficult to increase the transmittance of the first information layer.

For above reasons, material of the first thermodiffusion layer is preferably containing at least one of nitride, oxide, sulfide, nitride oxide, carbide and fluoride. Examples of such materials include AlN, $Al_2O_3$, SiC, SiN, $SnO_2$, $In_2O_3$, ZnO, ITO (indium oxide-tin oxide), IZO (indium oxide-zinc oxide), ATO (tin oxide-stibium), DLC (diamond-like carbon), BN, and the like.

The thermodiffusion layers may be formed by various vapor growth methods, for example, vacuum vapor deposition, sputtering, plasma CVD, optical CVD, ion plating, and electron beam deposition, and among them, sputtering excels in terms of productivity and film quality, and the like.

The thickness of the first thermodiffusion layer is preferably 10 nm to 200 nm. If it is thinner than 10 nm, heat dissipation effect cannot be obtained. If it is thicker than 200 nm, stress increases and poses problems in productivity as well as deteriorating repeated recording property.

Meanwhile, it is fine to dispose the thermodiffusion layer between the first lower protective layer and the first substrate to further improve thermodiffusion effect.

The manufacturing method of one-side multilayer, phase-change optical recording medium of the invention is explained below.

One of the manufacturing methods consists of film-forming process, initialization process and adherence process and each process is basically performed in this sequence.

In the film-forming process, the first information layer is disposed on the surface of the first substrate on which guiding grooves are formed and the second information layer is disposed on the surface of the second substrate on which guiding grooves are formed.

Each layer composing the first information layer and the second information layer respectively are formed by various vapor growth methods, for example, vacuum vapor deposition, sputtering, plasma CVD, optical CVD, ion plating and electron beam deposition, and among them, sputtering excels in terms of productivity and film quality, and the like.

In sputtering, film-forming is performed by circulating inactive gas such as argon, and the like in general and it is possible to perform a reaction sputtering while mixing in oxygen, nitrogen, and the like.

In initialization process, the entire surface of the first and the second information layers are initialized by outputting energy beams such as laser beam, etc., in other words, the recording layers are crystallized.

When a film is likely to become separated by laser beam energy in initialization process, an overcoat may be disposed on the first and the second information layers by spin coating UV resin, and the like and curing it by ultraviolet irradiation.

Moreover, it is possible to initialize the first and the second information layers from the first substrate after subsequent adherence process is performed on ahead.

Next, the first information layer disposed on the surface of the first substrate on which guiding grooves are formed and the second information layer disposed on the surface of the second substrate on which guiding grooves are formed, which have been initialized as above, are bonded via intermediate layer while placing the first information layer and the second information layer face-to-face.

For example, it is possible to cure a resin by ultraviolet irradiation after spincoating the ultraviolet curing resin on either side of the film surface as an intermediate layer and pressurizing and bonding both substrates while putting both film surfaces face-to-face.

Next, other manufacturing method of multilayer, phase-change optical recording medium of the invention is explained. This method consists of the first film-forming process, the intermediate layer forming process, the second film-forming process, substrate-bonding process and initialization process and each process is basically performed in this sequence. Grooves of the multilayer phase-change optical recording medium manufactured by this method are formed on the first substrate and intermediate layer.

In the first film-forming process, a first information layer is formed on the surface of the first substrate on which grooves are formed. The film-forming process is as described above.

In the intermediate layer forming process, an intermediate layer having guiding grooves is formed on the first information layer. For example, it is possible to form a groove by coating ultraviolet curing resin on entire surface of the first information layer and curing it by ultraviolet irradiation while pressing a stamper made from a material which can transmit ultraviolet ray against it. In the second film-forming process, a second information layer is formed on the intermediate layer. The film-forming process is as described above.

In substrate-bonding process, the second information layer and the second substrate are bonded by an adhesive material. For example, a material for adhesive layer, an ultraviolet curing resin, is spincoated and cured by ultraviolet irradiation after the second information layer and the second substrate are bonded.

In initialization process, the entire surface of the recording layer is initialized (crystallized) by outputting energy beam such as laser beam to the first information layer and the second information layer from the first substrate side.

Figure 3:
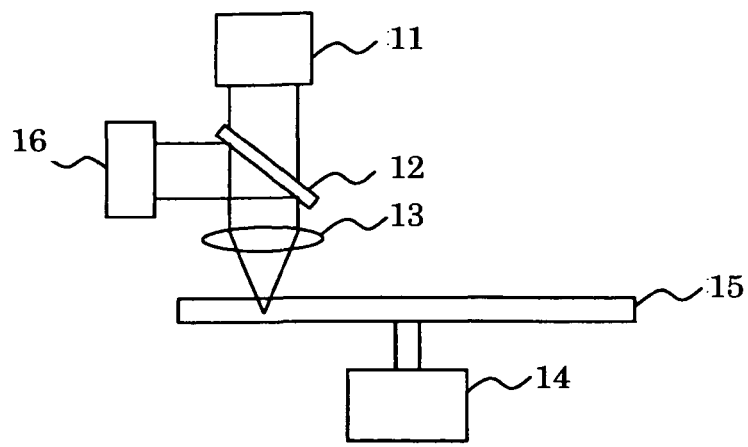
FIG. 3 is an illustrative embodiment of the apparatus for recording and reproducing of the optical recording medium according to the present invention.

FIG. 3 is an outlined view of the apparatus for performing recording and reproducing of one-side multilayer optical recording medium according to the invention. Recording and reproducing of information signal are performed by focusing the laser beam from the laser diode 11 through half mirror 12 and objective lens 13 onto the optical recording medium 15 which is being rotated by the spindle motor 14. No. 16 is a photodetector.

(Advantages of the Invention)

It is possible to provide one-side multilayer, recordable optical recording medium and phase-change optical recording medium capable of stable tracking and appropriate recording and reproducing at each recording layer.

In addition, it is possible to provide one-side multilayer, recordable optical recording medium and phase-change optical recording medium capable of stable reproducing with existing DVD-ROM drives when using optical recording medium of the invention of which DPD signal is 0.3 or more.

Moreover, according to the recording and reproducing method of the invention, it is possible to perform appropriate recording and reproducing using one-side multilayer optical recording medium and phase-change optical recording medium of the invention.

And by this invention, it is possible to provide recording and reproducing apparatus of one-side multilayer, recordable optical recording medium and phase-change optical recording medium capable of stable tracking and appropriate recording and reproducing at each recording layer.

EXAMPLES

The invention is further explained in detail referring to Examples and Comparative Examples below; however, this is not construed as limiting the scope of the invention. Meanwhile, groove width and groove depth of the first and the second substrates of each Example and Comparative Example are values obtained using the interference optical power of HeNe laser. The groove width means a half-value groove width.

Example 1

A solution, in which following compound expressed by Formula 3 was dissolved in 2,2,3,3-tetrafluoropropanol, was spincoated on a first substrate which consist of polycarbonate resin (refraction index $n_1=1.58$) of 12 cm diameter and 0.6 mm thickness having guiding groove of 0.74 μm track pitch, 0.30 μm groove width and 145 nm groove depth to form a first organic dye recording layer of 60 nm thickness.

Next, a first reflective layer of 10 nm thickness which consist of Ag was formed on the recording layer by magnetron sputtering and on this, a first thermodiffusion layer of 30 nm thickness which consist of IZO [$In_2O_3$—ZnO (10% by mass)] was formed to produce a first information layer.

And, on the first information layer formed as described above, a resin (refraction index $n_2=1.58$) was coated and an intermediate layer having guiding groove of 0.74 μm track pitch, 0.25 μm groove width and 150 nm groove depth was formed by 2P (photo polymerization). The thickness of the intermediate layer was 50 μm.

Furthermore, on the above, a second organic dye recording layer of 90 nm thickness was formed by forming a protective layer of 20 nm thickness which consist of $SiO_2$ and spincoating the same solution as for the first information layer and then a second information layer was produced by forming a second reflective layer of 60 nm thickness which consist of Au.

Next, a one-side multilayer, recordable optical disc was produced by coating ultraviolet curing resin on the film surface of the second information layer, spincoating after bonding with the second substrate having no guiding grooves and bonding after curing ultraviolet curing resin by ultraviolet irradiation from the second substrate side.

Formula 3

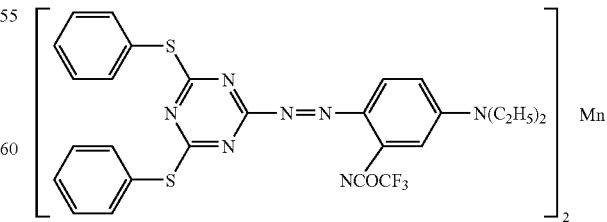

The push-pull value of the first information layer, PP1 and the push-pull value of the second information layer, PP2 of above optical disc prior to recording were measured by optical disc evaluation apparatus (laser wavelength of 658 nm and numerical aperture, NA of 0.65) and results were as follow:
PP1=0.40, PP2=0.42 and PP1/PP2=0.95. And reflectance of the first information layer was 19.1% and reflectance of the second information layer was 18.4%.

Moreover, the mark jitter of 3T signal after recording EFM random signal in groove part of this optical disc at a linear velocity of 3.49 m/s was 9% or less at the recording power of 25 mW or less and modulation was 50% or more for both of the first information layer and the second information layer. And DPD signal was 0.3 or more.

Example 2

A multilayer recordable optical disc was produced similarly to Example 1, except for altering the groove width of the first substrate to 0.20 µm and the groove depth to 110 nm and the groove width of the intermediate layer to 0.291 µm and groove depth to 105 nm. The push-pull value of the first information layer, PP1 and the push-pull value of the second information layer, PP2 prior to recording were measured and results were as follow:
PP1=0.35, PP2=0.30 and PP1/PP2=1.17. And reflectance of the first information layer was 19.8% and reflectance of the second information layer was 18.5%.

Moreover, the mark jitter of 3T signal after recording EFM random signal in this optical disc at a linear velocity of 3.49 m/s was 9% or less at the recording power of 25 mW or less and modulation was 50% or more for both of the first information layer and the second information layer. DPD signal was 0.3 or more.

Example 3

A multilayer recordable optical disc was produced similarly to Example 1, except for altering the groove width of the first substrate to 0.36 µm and the groove depth to 160 nm and the groove width of the intermediate layer to 0.30 µm and the groove depth to 158 nm.

The push-pull value of the first information layer, PP1 and the push-pull value of the second information layer, PP2 prior to recording were measured and results were as follow:
PP1=0.61, PP2=0.58 and PP1/PP2=1.05. And reflectance of the first information layer was 18.4% and reflectance of the second information layer was 18.1%.

Moreover, the mark jitter of 3T signal after recording EFM random signal in this optical disc at a linear velocity of 3.49 m/s was 9% or less at the recording power of 25 mW or less and modulation was 50% or more for both of the first information layer and the second information layer. And DPD signal was 0.3 or more.

Example 4

A multilayer recordable optical disc was produced similarly to Example 1, except for altering the groove width of the first substrate to 0.32 µm and the groove depth to 180 nm and the groove width of the intermediate layer to 0.37 µm and the groove depth to 170 nm. The push-pull value of the first information layer, PP1 and the push-pull value of the second information layer, PP2 prior to recording were measured and results were as follow:
PP1=0.70, PP2=0.60 and PP1/PP2=1.17. The reflectance of the first information layer was 18.6% and the reflectance of the second information layer was 18.3%.

Moreover, the mark jitter of 3T signal after recording EFM random signal in this optical disc at a linear velocity of 3.49 m/s was 9% or less at the recording power of 25 mW or less and modulation was 50% or more for both of the first information layer and the second information layer. DPD signal was 0.3 or more.

Comparative Example 1

A multilayer recordable optical disc was produced similarly to Example 1, except for altering the groove width of the first substrate to 0.40 µm and the groove depth to 87 nm and the groove width of the intermediate layer to 0.38 µm and the groove depth to 98 nm. The push-pull value of the first information layer, PP1 and the push-pull value of the second information layer, PP2 prior to recording were measured and results were as follow:
PP=0.25, PP2=0.24 and PP1/PP2=1.06. The reflectance of the first information layer was 20.4% and the reflectance of the second information layer was 18.9%.

Moreover, the mark jitter of 3T signal after recording EFM random signal in this optical disc at a linear velocity of 3.49 m/s was 9% or more at the recording power of 25 mW and modulation was less than 50% and it was concluded that this has no advantages over Examples 1 to 4.

Comparative Example 2

A multilayer recordable optical disc was produced similarly to Example 1, except for altering the groove width of the first substrate to 0.25 µm and the groove depth to 200 nm and the groove width of the intermediate layer to 0.28 µm and the groove depth to 155 nm. The push-pull value of the first information layer, PP1 and the push-pull value of the second information layer, PP2 prior to recording were measured and results were as follow:
PP1=0.72, PP2=0.40 and PP1/PP2=0.8. The reflectance of the first information layer was 18.1% and the reflectance of the second information layer was 17.1%. Moreover, the reflectance of this optical disc was measured and the result was 18% or less for both of the first information layer and the second information layer, and although EFM random signal was recorded at a linear velocity of 3.49 m/s and the disc was inserted to the DVD-ROM drive, it was not recognized.

An experimental manufacturing test of multilayer recordable optical disc was conducted as follow besides Examples 1 to 4.

Figure 4:
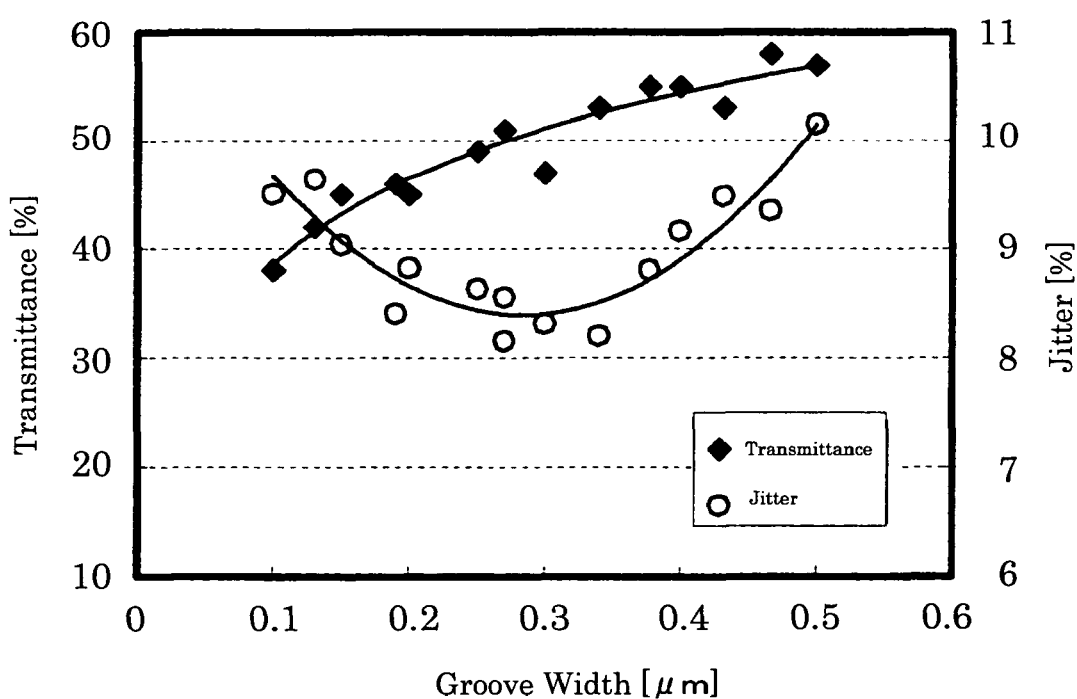
FIG. 4 is a graph showing a relation between the groove width of one-side multilayer, recordable optical recording medium and the transmittance of the first information layer.

A multilayer recordable optical disc was produced similarly to Example 1, except for altering the groove depth of the first substrate to 150 nm and the groove width to between 0.1 µm to 0.5 µm and adjusting the thickness of the first recording layer and the first thermodiffusion layer so as the reflectance of unrecorded part of each first information layer becomes 19%. FIG. 4 is a graph showing a relation between groove width of each optical disc, reflectance of the first information layer and mark jitter of 3T signal. It was found that to make reflectance 40% or more and jitter 9% or less, the groove width is preferably in a range of 0.15 µm to 0.4 µm. This is a range of $0.2 \leqq w_1/p_1 \leqq 0.55$ as expressed by the ratio with track pitch.

Figure 5:
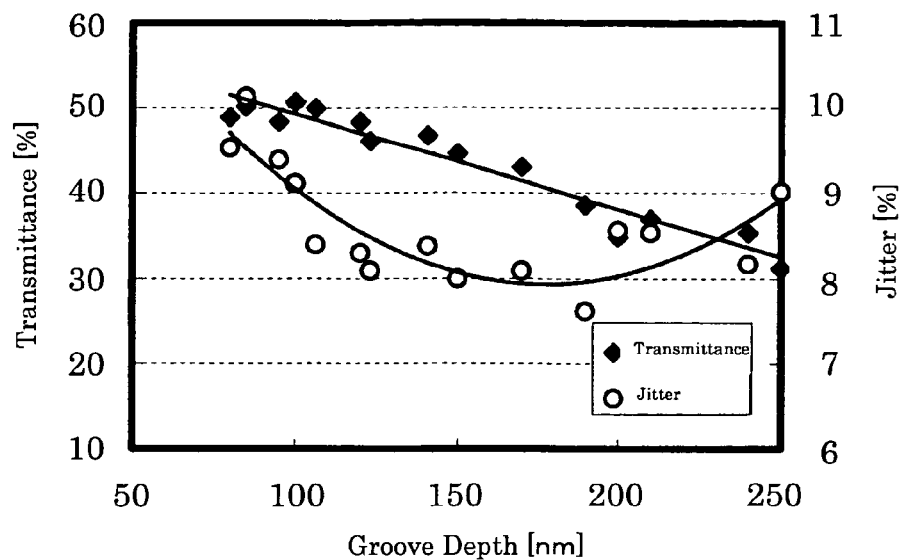
FIG. 5 is a graph showing a relation between the groove depth of one-side multilayer, recordable optical recording medium and the transmittance of the first information layer.

Moreover, a multilayer recordable optical disc was produced similarly to Example 1, except for altering the groove width of the first substrate to 0.26 µm and the groove depth to between 85 nm to 300 nm and adjusting the thickness of the first recording layer and the first thermodiffusion layer so as the reflectance of unrecorded part of each first information layer becomes 19%. FIG. 5 is a graph showing a relation between groove depth of each optical disc, reflectance of the first information layer and mark jitter of 3T signal that are shown in a graph. It was found that to make reflectance 40% or more and jitter 9% or less, the groove depth is preferably in a range of $4\lambda/16n_1 \leq d_1 \leq 7\lambda/16n_1$.

Figure 6:
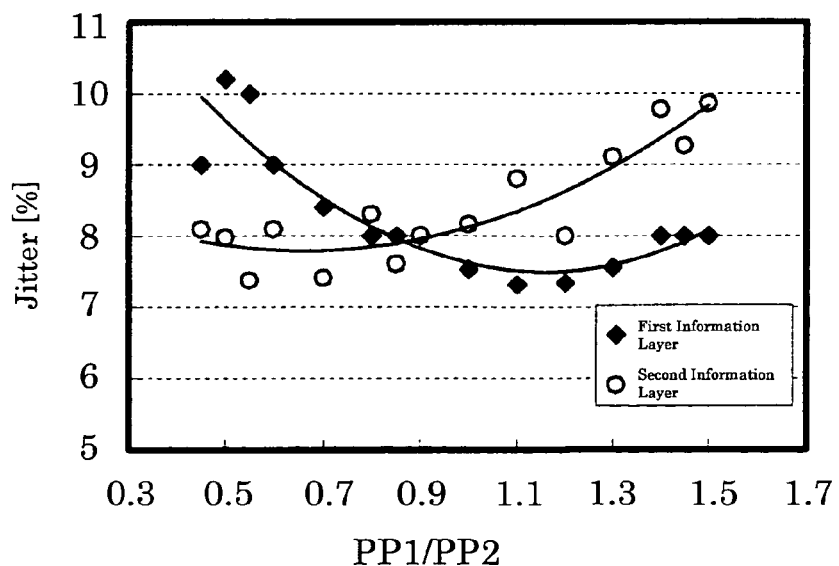
FIG. 6 is a graph showing a relation between PP1/PP2 and jitter of one-side multilayer, recordable optical recording medium.

Furthermore, a multilayer recordable optical disc was produced altering groove width and groove depth besides above Examples and PP1 and PP2 of each optical disc were measured. And it was confirmed that if PP1 is in a range of 0.30 to 0.70 and PP2 is in a range of 0.25 to 0.60, it is possible to perform stable tracking for both layers, smooth read-out without tracking deviation during jumps between layers and jitter of the first information layer and the second information layer are 9% or less. Moreover, FIG. 6 is a graph showing a relation between PP1/PP2 of each disc and jitter of the first information layer and the second information layer. When PP1/PP2 is in a range of 0.6 to 1.4, jitter of both layers is 9% or less and appropriate recording and reproducing were possible.

Regard to the recording layer, when refraction index "n" at a wavelength region of 655±25 nm was $1.5 \leq n \leq 3.0$ and extinction coefficient "k" was in a range of $0.02 \leq k \leq 0.2$, even though the light power, Pw was 24 mW or less, an appropriate recording was possible.

Furthermore, a multilayer recordable optical disc was produced similarly to Example 1, except for altering the thickness of the first recording layer and the first thermodiffusion layer. EFM signal was recorded to each optical disc at a linear velocity of 3.49 m/sec and DPD signal was measured. As read-out was performed by reproducing-only DVD apparatus for each optical disc, a stable read-out was possible when DPD signal was 0.3 or more as shown in Table 1.

TABLE 1

| DPD Signal | Tracking |
|---|---|
| 0.28 | unstable |
| 0.29 | unstable |
| 0.3 | stable |
| 0.32 | stable |
| 0.37 | stable |
| 0.4 | stable |

Example 5

A first lower protective layer of 120 nm thickness which consist of $(ZnS)_{80}(SiO_2)_{20}$, a first recording layer of 6 nm thickness which consist of $Ge_5Ag_1In_2Sb_{70}Te_{22}$, a first upper protective layer of 15 nm thickness which consist of $(ZnS)_{80}(SiO_2)_{20}$, a first reflective layer of 10 nm thickness which consist of $Ag_{98}Zn_1Al_1$ and a first thermodiffusion layer of 120 nm thickness which consist of IZO ($In_2O_3$-10% by mass of Zn) were formed in this sequence on a first substrate of 12 cm diameter and 0.6 mm thickness which consist of polycarbonate resin (refraction index $n_1$=1.58) having guiding groove of 0.74 μm track pitch, 0.30 μm groove width and 31 nm groove depth on the surface by magnetron sputtering in Ar gas atmosphere using a sheet sputtering apparatus by Balzers Ltd. to produce a first information layer.

Next, a second reflective layer of 120 nm thickness which consist of $Al_{99}Ti_1$, a second upper protective layer of 20 nm thickness which consist of $(ZnS)_{80}(SiO_2)_{20}$, a second recording layer of 15 nm thickness which consist of $Ge_4Ag_1In_3Sb_{70}Te_{22}$ and a second lower protective layer of 130 nm thickness which consist of $(ZnS)_{80}(SiO_2)_{20}$ are formed in this sequence on the second substrate of which groove width and groove depth of the first substrate has been altered to 0.25 μm and 31 nm respectively by sputtering in Ar gas atmosphere to produce a second information layer.

Next, initialization process was performed to the first information layer and the second information layer by irradiating a laser beam from the first substrate side and the surface side of the second information layer respectively.

Next, a one-side multilayer, phase-change optical recording medium having multiple information layers was produced by coating ultraviolet curing resin (refraction index, $n_2$=1.58) on the surface of the first information layer, bonding and spincoating the surface side of the second information layer on the second substrate and forming an intermediate layer by curing the ultraviolet curing resin by irradiating ultraviolet beam from the first substrate side. The thickness of the intermediate layer was 50 μm.

The push-pull value of the first information layer, PP1 and the push-pull value of the second information layer, PP2 of this optical disc prior to recording were measured by an optical disc evaluation apparatus (at a laser wavelength of 660 nm and numerical aperture, NA of 0.65) and results were as follow:
PP1=0.38, PP2=0.43 and PP1/PP2=0.86.

Increase in mark jitter of 3T signal after 1,000 times of overwrite of EFM random signal in the groove part of this optical disc at a linear velocity of 3.49 m/s, write laser power of 28 mW and erase laser power of 10 mW were 0.9% for the first information layer and 0.6% for the second information layer. And when the mark jitter of which a random signal was recorded in only one track for once and the mark jitter of central track of which a random signal was recorded also in adjacent tracks of left and right for once were compared, the latter was larger only by 0.2%. And DPD signal was 0.3 or more.

Example 6

A one-side multilayer, phase-change optical disc was produced similarly to Example 5 except for altering the groove width of the first substrate to 0.20 μm, the groove depth to 25 nm, the thickness of the first thermodiffusion layer which consist of AlN to 80 nm, the groove width of the second substrate to 0.29 μm and the groove depth to 25 nm. The push-pull value of the first information layer, PP1 and the push-pull value of the second information layer, PP2 prior to recording were measured and results were as follow:
PP1=0.30, PP2=0.28 and PP1/PP2=1.07.

Increase in mark jitter of 3T signal after 1,000 times of overwrite of EFM random signal in this optical disc at a linear velocity of 3.49 m/s, write laser power of 28 mW and erase laser power of 10 mW were 0.8% for the first information layer and 0.8% for the second information layer. And when the mark jitter of which a random signal was recorded in only one track for once and the mark jitter of the central track of which a random signal was recorded also in adjacent tracks of left and right for once were compared, the latter was larger only by 0.6%. And DPD signal was 0.3 or more.

Example 7

A one-side multilayer, phase-change optical disc was produced similarly to Example 5 except for altering the groove width of the first substrate to 0.35 μm, the groove depth to 37 nm, the thickness of the first thermodiffusion layer which consist of AlN to 80 nm, the groove width of the second substrate to 0.27 μm and the groove depth to 37 nm. The push-pull value of the first information layer, PP1 and the push-pull value of the second information layer, PP2 prior to recording were measured and results were as follow:
PP1=0.45, PP2=0.46 and PP1/PP2=0.98.

Increase in mark jitter of 3T signal after 1,000 times of overwrite of EFM random signal in this optical disc at a linear velocity of 3.49 m/s, write laser power of 28 mW and erase laser power of 10 mW were 0.7% for the first information layer and 0.5% for the second information layer. And when the mark jitter of which a random signal was recorded in only one track for once and the mark jitter of the central track of which a random signal was recorded also in adjacent tracks of left and right for once were compared, the latter was larger only by 0.2%. And DPD signal was 0.3 or more.

Example 8

A one-side multilayer, phase-change optical disc was produced similarly to Example 5 except for altering the groove width of the first substrate to 0.36 μm, the groove depth to 53 nm, the thickness of the first thermodiffusion layer which consist of ITO ($In_2O_3$-10% by mass of $SnO_2$) to 120 nm, the groove width of the second substrate to 0.30 μm and the groove depth to 50 nm. The push-pull value of the first information layer, PP1 and the push-pull value of the second information layer, PP2 prior to recording were measured and results were as follow:
PP1=0.60, PP2=0.58 and PP1/PP2=1.03.

Increase in mark jitter of 3T signal after 1,000 times of overwrite of EFM random signal in this optical disc at a linear velocity of 3.49 m/s, write laser power of 28 mW and erase laser power of 10 mW were 1.2% for the first information layer and 0.9% for the second information layer. And when the mark jitter of which a random signal was recorded in only one track for once and the mark jitter of the central track of which a random signal was recorded also in adjacent tracks of left and right for once were compared, the latter was larger only by 0.2%. And DPD signal was 0.3 or more.

Comparative Example 3

A one-side multilayer, phase-change optical disc was produced similarly to Example 5 except for altering the groove width of the first substrate to 0.40 μm, the groove depth to 13 nm, the thickness of the first thermodiffusion layer which consist of ITO ($In_2O_3$-10% by mass of $SnO_2$) to 120 nm, the groove width of the second substrate to 0.38 μm and the groove depth to 13 nm. The push-pull value of the first information layer, PP1 and the push-pull value of the second information layer, PP2 prior to recording were measured and results were as follow:
PP1=0.23, PP2=0.20 and PP1/PP2=1.15.

Increase in mark jitter of 3T signal after 1,000 times of overwrite of EFM random signal in this optical disc at a linear velocity of 3.49 m/s, write laser power of 28 mW and erase laser power of 10 mW were 3.5% for the first information layer and 2.7% for the second information layer. And when the mark jitter of which a random signal was recorded in only one track for once and the mark jitter of the central track of which a random signal was recorded also in adjacent tracks of left and right for once were compared, the latter was larger by 4.5% and it was found to be inferior to Examples 5 to 8.

Comparative Example 4

A one-side multilayer, phase-change optical disc was produced similarly to Example 5 except for altering the groove width of the first substrate to 0.25 μm, the groove depth to 88 nm, the thickness of the first thermodiffusion layer which consist of ITO ($In_2O_3$-10% by mass of $SnO_2$) to 120 nm, only the groove depth of the second substrate to 85 nm (the groove width was remained 0.25 μm). The push-pull value of the first information layer, PP1 and the push-pull value of the second information layer, PP2 prior to recording were measured and results were as follow:
PP1=0.67, PP2=0.63 and PP1/PP2=1.06.

Increase in mark jitter of 3T signal after 1,000 times of overwrite of EFM random signal in this optical disc at a linear velocity of 3.49 m/s, write laser power of 28 mW and erase laser power of 10 mW were 4.5% for the first information layer and 4.3% for the second information layer which were significantly larger and this was found to be inferior to Examples 5 to 8.

Example 9

A one-side multilayer, phase-change optical disc was produced similarly to Example 5. The transmittance at 660 nm was measured from the first substrate side, using a spectrophotometer by Shimadzu Corporation (MPC-2200) and result was 47%.

The reflectance of this optical disc prior to recording was measured using an optical disc evaluation apparatus (at a laser wavelength of 660 nm and numerical aperture, NA of 0.65) and results were 9.6% for the first information layer and 9.2% for the second information layer.

Additionally, EFM random signal was recorded in this optical disc at a linear velocity of 3.49 m/s, write laser power of 28 mW and erase laser power of 10 mW and resulted jitter were 8.3% for the first information layer and 8.7% for the second information layer.

Comparative Example 5

A one-side multilayer, phase-change optical disc was produced similarly to Example 5 except for altering the groove width of the first substrate to 0.13 μm, the groove depth to 27 nm, the groove width of the second substrate to 0.25 μm and the groove depth to 31 nm. The transmittance of the first information layer at 660 nm was measured from the first substrate side using a spectrophotometer by Shimadzu Corporation (MPC-2200), and result was 39%.

The push-pull value of the first information layer, PP1 and the push-pull value of the second information layer, PP2 prior to recording were measured and results were as follow:
PP1=0.29, PP2=0.43 and PP1/PP2=0.67. The reflectances were 9.4% for the first information layer and 6.3% for the second information layer.

Additionally, EFM random signal was recorded in this optical disc at a linear velocity of 3.49 m/s, write laser power of 28 mW and erase laser power of 10 mW and resulted jitter were 8.3% for the first information layer, however, the jitter of the second information layer was as large as 13.7% and this was found to be inferior as an optical disc.

When Example 9 and Comparative Example 5 are compared, the groove width of the first substrate of the optical disc in Example 9 is 0.30 μm, however, if the groove width of the first substrate is narrower than 0.15 μm ($w_1/p_1$=0.2) as in Comparative Example 5, when the thickness is adjusted so as to make reflectance approximately 9% for stable focusing, it was found that the transmittance is deteriorated. For this reason, it was found that the sensitivity of the second information layer is deteriorated and jitter value becomes 9% or more in Comparative Example 5.

An experimental manufacturing test of multilayer phase-change optical disc was conducted as follow besides above Examples.

Figure 7:
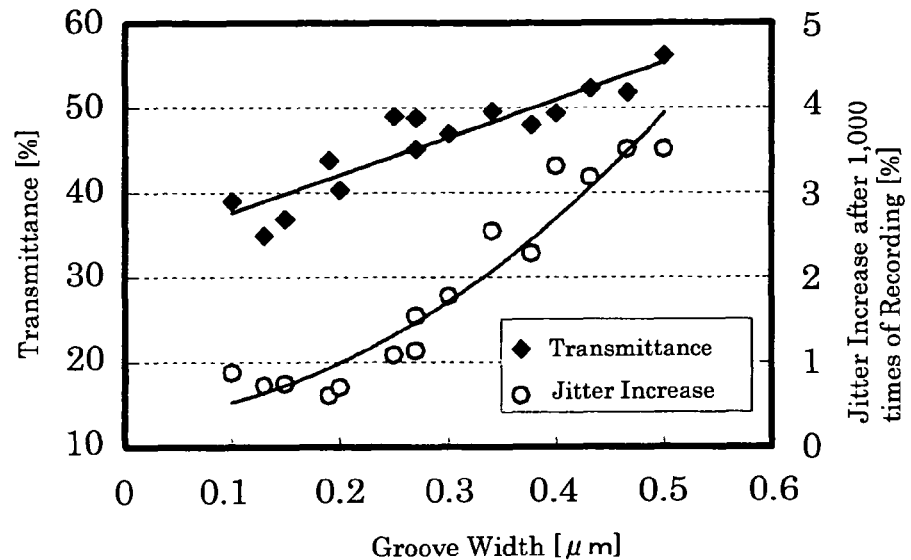
FIG. 7 is a graph showing a relation between the groove width of one-side multilayer, phase-change optical recording medium and the transmittance of the first information layer.

A multilayer phase-change optical disc was produced similarly to Example 5, except for altering the groove depth of the first substrate to 31 nm and the groove width to between 0.1 µm to 0.5 µm and adjusting the thickness of the first lower protective layer and the first thermodiffusion layer so as to make reflectance of unrecorded part of each first information layer 9%. FIG. 7 is a graph showing a relation between groove width of each optical disc, transmittance of the first information layer and increased amount of mark jitter of 3T signal after 1,000 times of recording. To make transmittance 40% or more and jitter increase after 1,000 times of recording 3% or less, it was found that the relation between groove width and track pitch is preferably in a range of $0.2 \leq w_1/p_1 \leq 0.6$.

Figure 8:
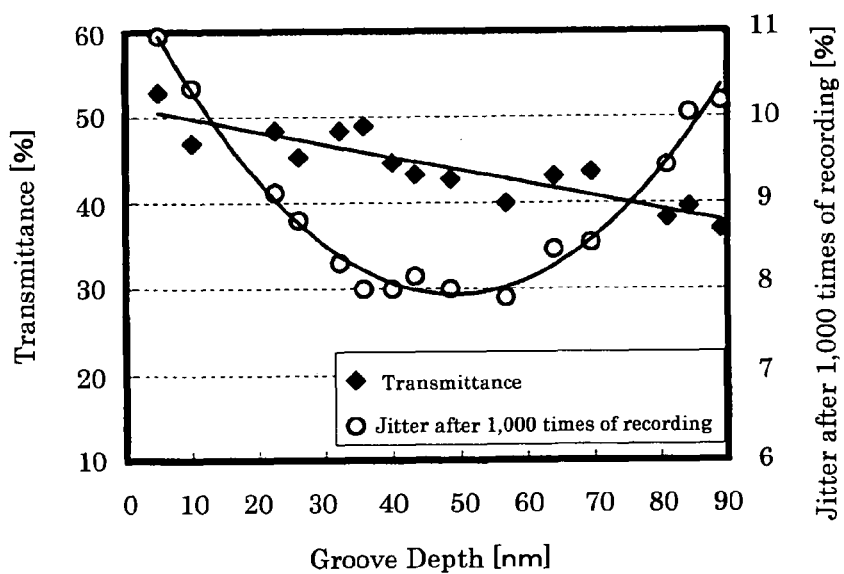
FIG. 8 is a graph showing a relation between the groove depth of one-side multilayer, phase-change optical recording medium and the transmittance of the first information layer.

Moreover, a multilayer phase-change optical disc was produced similarly to Example 5, except for altering the groove width of the first substrate to 30 µm and the groove depth to between 5 nm to 90 nm and adjusting the thickness of the first lower protective layer and the first thermodiffusion layer so as to make reflectance of unrecorded part of each first information layer 9%. FIG. 8 is a graph showing a relation between groove depth of each optical disc, transmittance of the first information layer and mark jitter of 3T signal. It was found that to make transmittance 40% or more and jitter 9% or less, the groove depth is preferably in a range of $0.9\lambda/16n_1 \leq d_1 \leq 3\lambda/16n_1$ and more preferably in a range of $\lambda/16n_1 \leq d_1 \leq 3\lambda/16n_1$.

Figure 9:
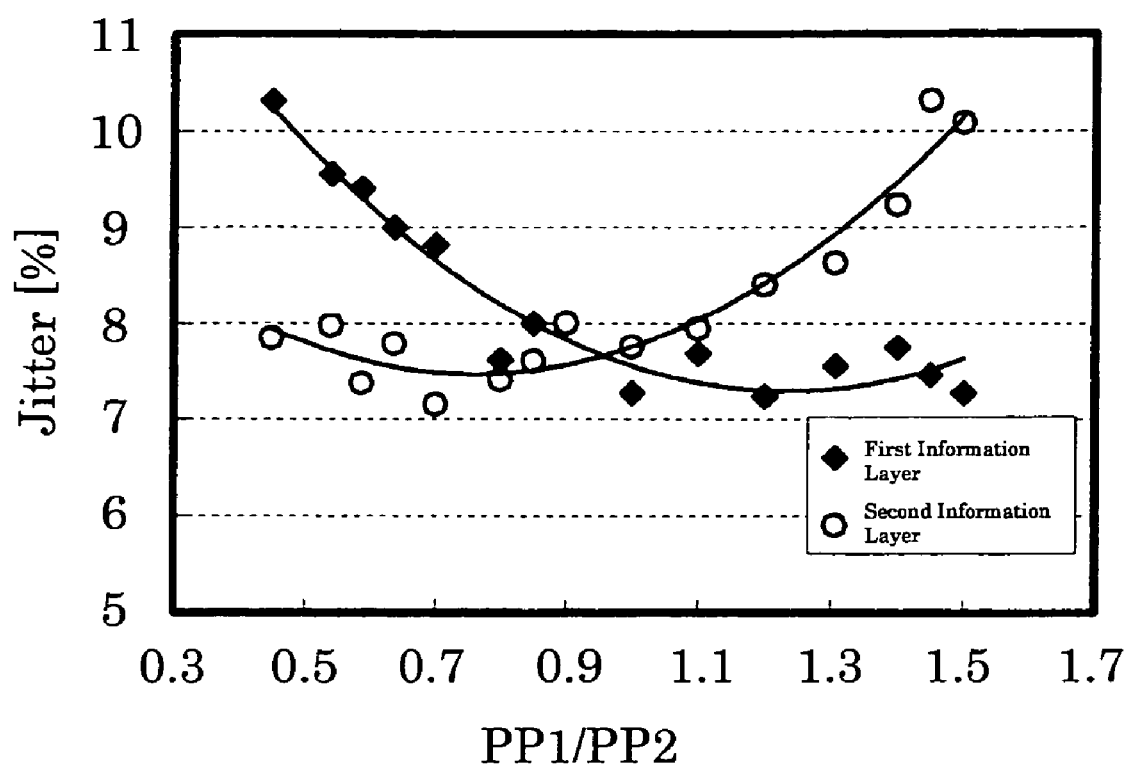
FIG. 9 is a graph showing a relation between PP1/PP2 and jitter of one-side multilayer, phase-change optical recording medium.

Furthermore, a multilayer phase-change optical disc was produced altering groove width and groove depth besides above Examples and PP1 and PP2 of each optical disc were measured. And it was confirmed that if PP1 is in a range of 0.30 to 0.70 and PP2 is in a range of 0.25 to 0.60, it is possible to perform stable tracking for both layers and smooth readout without tracking deviation during jumps between layers, and jitter of the first information layer and the second information layer were 9% or less. Moreover, FIG. 9 is a graph showing a relation between PP1/PP2 of each disc and jitter of the first information layer and the second information layer. When PP1/PP2 was in a range of 0.6 to 1.4, jitter of both layers were 9% or less and appropriate recording and reproducing were possible.

Examples 10 to 24

A multilayer phase-change optical disc was produced similarly to Example 5, except for using the material of the composition as shown in Table 2 for the material of the first recording layer.

The mark jitter of 3T signal after 10 times of recording and 100 times of overwrite when EFM random signal was recorded in the optical disc at a linear velocity of 3.49 m/s, write laser power of 28 mW and erase laser power of 10 mW are shown in Table 2. Jitters of all discs were 9% or less and appropriate.

TABLE 2

| | | | | Jitter of the First Information Layer | |
|---|---|---|---|---|---|
| | M | W (atomic %) | Z (atomic %) | After one recording (%) | After 100 times of Recording (%) |
| Example 10 | In, Ga | 3 | 74 | 7.5 | 8.1 |
| Example 11 | Si | 2 | 71 | 7.8 | 8.5 |

TABLE 2-continued

| | | | | Jitter of the First Information Layer | |
|---|---|---|---|---|---|
| | M | W (atomic %) | Z (atomic %) | After one recording (%) | After 100 times of Recording (%) |
| Example 12 | Ge, Al | 6 | 68 | 8.1 | 8.7 |
| Example 13 | Sn | 1 | 71 | 7.6 | 8.4 |
| Example 14 | Ag, Zr | 2 | 71 | 7.8 | 8.7 |
| Example 15 | In, Nb | 2.6 | 70 | 8 | 8.6 |
| Example 16 | Ta | 2 | 73 | 7.8 | 8.4 |
| Example 17 | V | 3 | 73 | 7.4 | 8.4 |
| Example 18 | Pt | 4 | 72 | 7.5 | 8.5 |
| Example 19 | Ge, Cr | 5 | 71 | 7 | 7.9 |
| Example 20 | Co | 3 | 72 | 7.6 | 8.5 |
| Example 21 | Ge, S | 6 | 69 | 8 | 8.8 |
| Example 22 | N | 1 | 76 | 7.4 | 8.4 |
| Example 23 | Pb, In | 3 | 74 | 8.1 | 8.6 |
| Example 24 | O, Ge | 1 | 77 | 7.9 | 8.8 |

Example 25

A first lower protective layer of 120 nm thickness which consist of $(ZnS)_{70}\cdot(SiO_2)_{30}$, a first recording layer of 6 nm thickness which consist of $Ge_4Ag_1In_3Sb_{70}Te_{22}$, a first upper protective layer of 10 nm thickness which consist of $(ZnS)_{70}\cdot(SiO_2)_{30}$, a first reflective layer of 8 nm thickness which consist of $Ag_{98}Pd_1Cu_1$ and a first thermodiffusion layer of 35 nm thickness which consist of IZO ($In_2O_3$-10% by mass of Zn) were formed in this sequence on a first substrate which consist of polycarbonate resin (refraction index $n_1$=1.58) with 12 cm diameter and 0.57 mm thickness having guiding groove of 0.45 µm track pitch, 0.21 µm groove width and 30 nm groove depth by sputtering in Ar gas atmosphere to produce a first information layer.

A resin (DVD003 by Nippon Kayaku Co., Ltd. with refraction index, $n_2$=1.58) was coated on the first information layer and an intermediate layer of 0.45 µm track pitch, 0.21 µm groove width and 33 nm groove depth having irregularity for tracking guide was produced by 2P (photo polymerization). The thickness of the intermediate layer was 30 µm.

Furthermore, a second lower protective layer of 55 nm thickness which consist of $(ZnS)_{70}\cdot(SiO_2)_{30}$, a second recording layer of 12 nm thickness which consist of $Ge_5Ag_1In_2Sb_{70}Te_{22}$, a second upper protective layer of 20 nm thickness which consist of $(ZnS)_{70}\cdot SiO_2)_{30}$ and a second reflective layer of 160 nm thickness which consist of $Ag_{98}Pd_1Cu_1$ are formed in this sequence by sputtering in Ar gas atmosphere to produce a second information layer.

Additionally, the first substrate of 12 cm diameter and 0.6 mm thickness which consist of polycarbonate film was bonded onto the surface of the second information layer to produce a multilayer phase-change information recording medium. Next, initialization was performed to the first information layer and the second information layer by irradiating a laser beam from the first substrate side.

The push-pull value of the first information layer, PP1 and the push-pull value of the second information layer, PP2 prior to recording were measured by an optical disc evaluation apparatus (at a laser wavelength of 405 nm and numerical aperture, NA of 0.65) and results were as follow:
PP1=0.42, PP2=0.45 and PP1/PP2=0.93. Alternatively, push-pull values at a laser wave length of 395 nm, 410 nm and 415 nm using different evaluation apparatus were measured and results were in a range of $0.30 \leq PP1 \leq 0.70$ and $0.25 \leq PP2 \leq 0.70$.

The mark jitter of 3T signal after 1,000 times of overwrite of 1-7RLL random signal in the groove part of this optical disc at a linear velocity of 5.3 m/s, write laser power of 14.5 mW and erase laser power of 5 mW were 9% or less and appropriate for both of the first information layer and the second information layer. And when the mark jitter of which a random signal was recorded in only one track for once and the mark jitter of the central track of which a random signal was recorded also in adjacent tracks of left and right for once were compared, the latter was larger only by 0.3%. And DPD signal was 0.3 or more.

What is claimed is:

1. An optical recording medium comprising:
a first information layer, an intermediate layer and a second information layer sequentially disposed between a first substrate and a second substrate,
wherein each information layer comprises a recordable recording layer comprising an organic dye and a groove is formed along the recording track,
wherein a laser beam at a wavelength $\lambda$ is irradiated from the first substrate side to perform any one of recording and reproducing of information by optical power modulation of binary or more, and
wherein when the refraction index of the first substrate being $n_1$, the refraction index of the intermediate layer being $n_2$, the groove depth, the groove width and the track pitch of the first information layer being $d_1$, $w_1$, and $p_1$ respectively and the groove depth, the groove width and the track pitch of the second information layer being $d_2$, $w_2$ and $p_2$ respectively, the following conditions are satisfied:

$4\lambda/16n_1 \leq d_1 \leq 7\lambda/16n_1$ $\lambda/16n_2 \leq d_2 \leq 3\lambda/16n_2$ or $4\lambda/16n_2 \leq d_2 \leq 7\lambda/16n_2$ $0.2 \leq w_1/p_1 \leq 0.55$ $0.2 \leq w_2/p_2 \leq 0.55$, and wherein the organic dye is a compound having a formula:

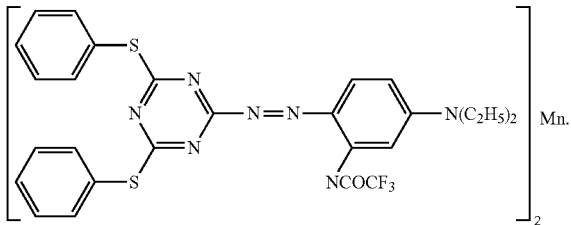

2. The optical recording medium according to claim 1, wherein when the push-pull value of the first information layer prior to recording being PP1 and the push-pull value of the second information layer prior to recording being PP2, the following conditions are satisfied:

$0.30 \leq PP1 \leq 0.70$ $0.25 \leq PP2 \leq 0.60$ $0.6 \leq PP1/PP2 \leq 1.4$

3. The optical recording medium according to claim 1, wherein the refraction index "n" of the recording layer of either the first or second information layer for the laser beam at a wavelength $\lambda$ of a wavelength region is $1.5 \leq n \leq 3.0$ and the extinction coefficient "k" is $0.02 \leq k \leq 0.2$.

4. The optical recording medium according to claim 1, wherein the reflectance of unrecorded part is 18% to 30%.

5. The optical recording medium according to claim 1, wherein the DPD signal is 0.3 or more.

6. The optical recording medium according to claim 1, wherein the wavelength $\lambda$ of the laser beam is any one in a range of 350 nm to 700 nm and satisfies the conditions.

7. The optical recording medium according to claim 6, wherein the wavelength $\lambda$ of the laser beam is any one in a range of 630 nm to 680 nm and 390 nm to 420 nm and satisfies the conditions.

8. The optical recording medium according to claim 2, wherein the PP1 and the PP2 satisfy the following conditions:

$0.61 \leq PP1 \leq 0.70$ $0.58 \leq PP2 \leq 0.60$.

9. An optical recording medium comprising:
a first information layer, an intermediate layer and a second information layer sequentially disposed between a first substrate and a second substrate,
wherein each information layer comprises a recording layer comprising a phase-change recording material and a groove is formed along the recording track,
wherein a laser beam at a wavelength $\lambda$ is irradiated from the first substrate to perform any one of recording and reproducing of information by optical power modulation of binary or more, and
wherein when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$0.9\lambda/16n_1 \leq d_1 \leq 3\lambda/16n_1$ $0.9\lambda/16n_2 \leq d_2 \leq 3\lambda/16n_2$ $0.2 \leq w_1/p_1 \leq 0.6$ $0.2 \leq w_2/p_2 \leq 0.6$ 10. The optical recording medium according to claim 9, wherein when the push-pull value of the first information layer prior to recording being PP1 and the push-pull value of the second information layer prior to recording being PP2, the following conditions are satisfied:

$0.30 \leq PP1 \leq 0.70$ $0.25 \leq PP2 \leq 0.60$ $0.6 \leq PP1/PP2 \leq 1.4$.

11. The optical recording medium according to claim 9, wherein the phase-change recording layer comprises an alloy expressed by M1w (SbzTe100-z) 100-w ("w" and "z" represent atomic % and $0 \leq w < 15$ and $50 < z < 90$ and M1 represents at least one element selected from a group of In, Ga, Ge, Sn, Si, Zr, Nb, Ta, V, Ag, Al, Pt, Pb, Cr, Co, O, S and N).

12. The optical recording medium according to claim 9, wherein the phase-change recording layer comprises an alloy expressed by (Ge-M2) xSbyTe3+x ("x" and "y" represent atomic % and $2 \leq x < 22$ and $2 \leq y \leq 4$ and M2 represents at least one element selected from a group of Sn, Bi and Pb).

13. The optical recording medium according to claim 9, wherein the reflectance of a mirror surface part, a part of the disc where there is no groove, is 4% to 20%.

14. The optical recording medium according to claim 9, wherein the DPD signal is 0.3 or more.

15. The optical recording medium according to claim 9, wherein the wavelength λ of the laser beam is any one in a range of 350 nm to 700 nm and satisfies above conditions.

16. The optical recording medium according to claim 15, wherein the wavelength λ of the laser beam is any one in a range of 630 nm to 680 nm and 390 nm to 420 nm and satisfies above conditions.

17. The optical recording medium according to claim 10, wherein the PP1 satisfies the following condition:

$$0.45 \leq PP1 \leq 0.70.$$

18. The optical recording medium according to claim 10, wherein the PP2 satisfies the following condition:

$$0.45 \leq PP2 \leq 0.60.$$

19. A recording and reproducing method of an optical recording medium, wherein recording and reproducing of information are performed by irradiating the laser beam at a wavelength of 350 nm to 700 nm to each information layer of the optical recording medium comprising:

a first information layer, an intermediate layer and a second information layer sequentially disposed between a first substrate and a second substrate, wherein each information layer comprises a recordable recording layer comprising an organic dye and a groove is formed along the recording track, wherein a laser beam at a wavelength λ is irradiated from the first substrate side to perform any one of recording and reproducing of information by optical power modulation of binary or more, and wherein when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$$4\lambda/16n_1 \leq d_1 \leq 7\lambda/16n_1$$

$$\lambda/16n_2 \leq d_2 \leq 3\lambda/16n_2 \text{ or } 4\lambda/16n_2 \leq d_2 \leq 7\lambda/16n_2$$

$$0.2 \leq w_1/p_1 \leq 0.55$$

$$0.2 \leq w_2/p_2 \leq 0.55, \text{ and}$$

wherein the organic dye is a compound having a formula:

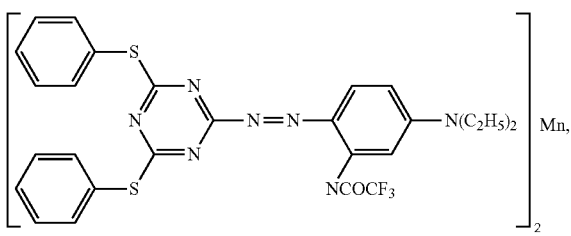

or the optical recording medium comprising:
a first information layer, an intermediate layer and a second information layer sequentially disposed between a first substrate and a second substrate, wherein each information layer comprises a recording layer comprising a phase-change recording material and a groove is formed along the recording track, wherein a laser beam at a wavelength λ is irradiated from the first substrate to perform any one of recording and reproducing of information by optical power modulation of binary or more, and wherein when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$$0.9\lambda/16n_1 \leq d_1 \leq 3\lambda/16n_1$$

$$0.9\lambda/16n_2 \leq d_2 \leq 3\lambda/16n_2$$

$$0.2 \leq w_1/p_1 \leq 0.49$$

$$0.2 \leq w_2/p_2 \leq 0.47.$$

20. An apparatus for performing recording and reproducing of the optical recording medium comprising:

a laser beam source from which a laser beam at a wavelength of 350 nm to 700 nm is irradiated, and a layer identifying unit and a layer switching unit for forming and dictating a mark on each information layer by irradiating the laser beam from the substrate side, wherein the optical recording medium is the optical recording medium comprising:

a first information layer, an intermediate layer and a second information layer sequentially disposed between a first substrate and a second substrate, wherein each information layer comprises a recordable recording layer comprising an organic dye and a groove is formed along the recording track, wherein a laser beam at a wavelength λ is irradiated from the first substrate side to perform any one of recording and reproducing of information by optical power modulation of binary or more, and wherein when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$$4\lambda/16n_1 \leq d_1 \leq 7\lambda/16n_1$$

$$\lambda/16n_2 \leq d_2 \leq 3\lambda/16n_2 \text{ or } 4\lambda/16n_2 \leq d_2 \leq 7\lambda/16n_2$$

$$0.2 \leq w_1/p_1 \leq 0.55$$

$$0.2 \leq w_2/p_2 \leq 0.55, \text{ and}$$

wherein the organic dye is a compound having a formula:

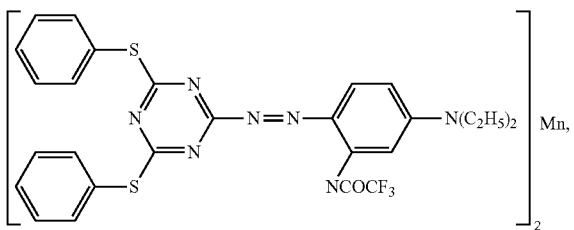

or the optical recording medium comprising:
  a first information layer, an intermediate layer and a second information layer sequentially disposed between a first substrate and a second substrate,
  wherein each information layer comprises a recording layer comprising a phase-change recording material and a groove is formed along the recording track,
  wherein a laser beam at a wavelength $\lambda$ is irradiated from the first substrate to perform any one of recording and reproducing of information by optical power modulation of binary or more, and
  wherein when the refraction index of the first substrate being $n_1$, the refraction index of the intermediate layer being $n_2$, the groove depth, the groove width and the track pitch of the first information layer being $d_1$, $w_1$ and $p_1$ respectively and the groove depth, the groove width and the track pitch of the second information layer being $d_2$, $w_2$ and $p_2$ respectively, the following conditions are satisfied:

$0.9\lambda/16n_1 \leq d_1 \leq 3\lambda/16n_1$ $0.9\lambda/16n_2 \leq d_2 \leq 3\lambda/16n_2$ $0.2 \leq w_1/p_1 \leq 0.49$ $0.2 \leq w_2/p_2 \leq 0.47$

* * * * *